United States Patent [19]

Dunn et al.

[11] 4,393,448
[45] Jul. 12, 1983

[54] NAVIGATIONAL PLOTTING SYSTEM

[75] Inventors: Thomas J. Dunn, Ocean Bluffs; Donald G. Yuniskis, Jr., Arlington; Gabor L. Szakacs, West Roxbury; Nghia V. Nguyen, Westwood, all of Mass.

[73] Assignee: Epsco Incorporated, Westwood, Mass.

[21] Appl. No.: 121,651

[22] Filed: Feb. 15, 1980

[51] Int. Cl.³ .................... G06F 15/50; G01S 5/14
[52] U.S. Cl. .................... 364/449; 364/520; 340/24
[58] Field of Search ........... 364/443, 444, 449, 450, 364/520, 452; 340/24, 27 NA; 343/112 C, 112 PT; 235/92 MP; 73/178 R; 33/1 M

[56] References Cited

U.S. PATENT DOCUMENTS

| | | | |
|---|---|---|---|
| 3,602,890 | 8/1971 | Colpitts | 364/520 |
| 3,659,085 | 4/1972 | Potter et al. | 364/449 |
| 3,843,873 | 10/1974 | Beville et al. | 235/92 MP |
| 3,967,098 | 6/1976 | Harnagel et al. | 364/443 |
| 4,005,368 | 1/1977 | Tanaka | 235/92 MP |
| 4,024,383 | 5/1977 | Beasley | 364/449 |
| 4,053,893 | 10/1977 | Boyer | 340/24 |
| 4,071,895 | 1/1978 | Wood et al. | 364/449 |
| 4,135,190 | 1/1979 | Dimatteo et al. | 340/24 |
| 4,192,002 | 3/1980 | Draper | 364/449 |

Primary Examiner—Gary Chin
Attorney, Agent, or Firm—Weingarten, Schurgin, Gagnebin & Hayes

[57] ABSTRACT

An improved navigational plotting system having convenient initialization and the ability to compute and superimpose hyperbolic time difference lines on a chart includes an X-Y plotter for plotting the position and course of a vessel on a navigational chart or a plain piece of paper, dictated by the reception of hyperbolic navigation signals. Ambiguity-free conversion to latitude and longitude is done automatically without the necessity of manually entering the initial latitude and longitude of the vessel. Remote initialization is established by placing the pen of the plotter on a known point or position on the chart and entering the latitude and longitude of this known position or its hyperbolic navigation coordinates, with all subsequent plot locations being referenced to this point on the chart. A set of default pre-stored conditions are utilized in the initialization procedure in which preset scale size and hyperbolic line parameters are assumed, with convenient override sequences being provided. The plotter includes a high accuracy rapid hyperbolic line drawing system utilizing a specialized approximation sequence for those charts which are not provided with hyperbolic navigation TD lines. A base line extension zone where hyperbolic position ambiguity is difficult to resolve (danger zone) is indicated by the preventing of the drawing of hyperbolic lines in this zone, thereby to give the navigator adequate indication that hyperbolic navigation readings may be ambiguous. A system is provided for rapid counter setting for the counters which drive the pen and also indicate vessel location or destination. This system utilizes differing rates of clocking the counters depending on whether the vessel or destination is on-chart or off-chart. As a further feature, velocity filtering prevents wild pen movement as a result of system transients. Additional auxiliary readout functions such as destination, range, velocity, time of arrival, heading, etc. are also provided.

16 Claims, 30 Drawing Figures

NAVIGATIONAL PLOTTING SYSTEM

FIELD OF THE INVENTION

This invention relates to navigational ploting systems and more particularly to a plotting system utilizing hyperbolic navigation coordinates not only to drive the plotter for the track of a vessel, but also, when required, to superimpose hyperbolic time difference lines either on a chart or on a plain charting surface.

BACKGROUND OF THE INVENTION

In hyperbolic navigation systems such as LORAN and OMEGA, the utilization of real time plotting as an aid to navigation has existed in the past in which time differences of arrival of signals from a master and slave stations indicate the position of the vessel or vehicle receiving the signals. It is the major function of these plotters to plot the track of the vessel or vehicle on a plotting surface so as to achieve a permanent record of the vehicle's progress. In terms of commercial fishing, it is often times necessary to display the area that a vessel traverses over a pre-determined fishing ground so that the pilot of the vessel may more accurately control his vessel for complete coverage.

Navigational plotting systems such as that described are also useful in air-sea search in terms of giving the navigator a clear picture of the area searched so that completeness of the search may be ascertained as well as the prevention of duplication of efforts.

The navigational plotter also creates a permanent record of the track of the vehicle so that proximity to navigational hazards may be readily ascertained and so that progress to a given point, harbor or place of refuge may be quickly displayed.

Some of the problems which have existed in prior plotters, are the need for the superposition of hyperbolic time difference lines on the charting surface for those charts which are not already over-printed with hyperbolic lines.

It will be appreciated that in the past the drawing of hyperbolic lines has been a time-consuming process even utilizing computer driven X-Y plotting devices. Thus on-station printing of hyperbolic lines has been both inconvenient and in times of emergency, not rapid enough to provide adequate navigation safety.

Concomitant with the drawing of hyperbolic lines is the necessity for initializing the system both as to the scale of the chart or charting surface to be utilized and as to the expected microsecond spacing of the hyperbolic lines in the area of interest. Moreover, since sets of hyperbolic time difference lines cross at more than one position on the earth's surface (with one crossing in an "extended area") it is usually necessary to manually enter the vessel's estimated latitude and longitude before a plotter can use the hyperbolic time differences (TDs) and convert them into latitude and longitude (lat./long.) for driving a plotting pen. This precludes total automatic operation. Also, it is important to be able to take into account the local anomalies and to be able to correct the plotter for a variety of different conditions.

It will be appreciated that merely placing the pen on a plotting surface and driving it in accordance with hyperbolic navigation signals is insufficient to create a true record of either vehicle position or vehicle track both as regards to fixed positions on the chart such as navigational channels and navigational aids and as to the scale itself. Additionally, it is important to be able to reference the pen position on the chart to known positions of objects on a chart such as a buoy or a rock, the latitude and longitude of which is precisely known. Without this type of initialization, scribings on the chart may not only be off-location, and therefore misrepresent the position of the vessel, but also differences in scale will obviously distort the vehicle track.

Although unknown to many mariners, in any hyperbolic navigation system, there is a danger zone which exists about the extension of the base line between the master station and a slave station in that there is an ambiguity as to exact position. For instance, when crossing such a zone, there are two points at which the same hyperbolic navigation reading is obtained and unless the navigator is aware that such a condition exists, he may infer a different position from his actual position. This extended base line danger zone is characteristic of all hyperbolic navigation systems and since the location of the slaves and master stations are usually unknown to the navigator, it is impossible for him to determine the existence of danger zones.

With respect to the actual plotting of the vehicle's track, it will be appreciated that there exist certain transients in signal detection which give false readings of positions. This can result in the vehicle track being deflected by large amounts which is not only disconcerting, but also often times the result is a misreading of position.

Of course, due to the limited charging area of the plotter, there are many occasions when the actual vehicle or vessel location is off-chart. While in the past there have been various techniques of stopping pen movement until the vehicle or vessel arrives back onto the chart surface, often times it takes an inordinately long time for the internal pen-drive and position indicating counters of the plotter to count up to the off-chart position. Thus all calculations must wait until the counters are clocked to the correct number, a time period which may be in excess of five minutes if, as is usual, the counters are clocked at the pen-drive stepping motor rate.

Another off-chart situation which results in a slow machine is the way in which hyperbolic lines are drawn. In one method of approximating a true hyperbolic line and as will be discussed hereinafter, a START point is defined on the true line and a GOAL is defined on the true line. If the deviation of the proposed line between START and GOAL from the true hyperbolic line is below a certain limit, a line is drawn which commences at the START point and ends up at the GOAL. Depending on the curvature of the true line, drawing lines in this manner may be a time consuming process involving drawing of a large number of short stubby lines.

Moreover, if the GOAL is off the chart, it is necessary to count up the counters to this GOAL point. If this is done at the pen-drive rate, it takes a long time to count up the counters.

Additionally, in repositioning the pen for the drawing of the next hyperbolic line, the pen repositioning must wait until the appropriate counters are either counted up or counted down. This traditionally has been done at the pen-drive rate.

SUMMARY OF THE INVENTION

The above problems are solved by the improved navigational plotting system of the subject invention. This plotting system is provided with a convenient initialization routine and also with the ability to rapidly compute and rapidly superimpose hyperbolic time difference lines on a chart through the utilization of the plotter's own pen. The plotter is utilized for displaying courses and positions of a vessel or vehicle on a navigational chart or a plain piece of paper, with the position of the vessel dictated by the reception and detection of hyperbolic navigation signals. In a typical installation, the plotting unit is coupled directly to the output of a LORAN C, OMEGA, or other type of hyperbolic navigation receiver in which time differences available at the receiver are coupled directly into the plotter. As part of the completely automatic initialization system, it is the function of the plotter to identify the master and slaves or secondary stations and to look up the appropriate set of constants so as to set up the required geometry for the system. This includes the identification of the particular chain involved, what stations are transmitting and their locations, and to pull data out of storage such as the latitude and longitude of the stations, their coding delay, group repetition interval (GRI) and their base line length which is the distance between a master and a given slave. This is followed by a latitude and longitude conversion on the received data to yield an estimated latitude and lontitude usuable in Campbell's algorithm for obtaining highly accurate TD to lat./long. conversions. Estimated lat./long. is provided by a specialized method which utilizes only the initial TDs and stored data to provide an unambiguous estimate of latitude and longitude without manual inputs.

The subject system also permits initialization in which TDs representing the vessel's present position are used. Alternatively for remote initialization, TDs other than those from the LORAN receiver may be specified. If the pen is initially placed so as to represent the present invention of the vessel or vehicle, that location is referenced so that the spot on the paper contacted by the pen has an identity. If the vessel then moves from that spot, the X-Y deviation is computed from this original position is and expressed in terms of X and Y pulses which are coupled to X-Y stepper motors which move the pen across the chart surface.

Remote initialization may be established in the subject system by placing the pen of the plotter on a known point or position on the chart and entering the latitude and longitude of this known position or its hyperbolic coordinates, whichever is more convenient. In this case all subsequent plot locations are referenced to this known point and an accurate track of the vessel relative to each of the features of the chart, is established.

Obviously the system may be set up to draw on charts of differing scales or on blank sheets of paper. Typical navigation charts utilize scales of 60,000:1. The plotter, in one embodiment, is provided with a set of "default" prestored conditions which, if no other conditions are entered, are assumed to be the appropriate conditions. For instance, the plotter may be set to a scale of 60,000:1 and may be set to assume that no remote initialization is required. It may call up a preset GRI for the stations operating in the area of interest. The use of default conditions simplifies the operation of the plotter when utilized in a given locality with one size chart. A convenient over-ride sequence is provided so that all of the variables necessary for the plot may be sequentially entered into the plotter or selectively ignored in favor of a given default condition. Examples of default conditions are the GRI rate; scale; pre-determined latitude and longitude; predetermined destinations and mode selection. Additional auxiliary readout functions may be provided with a mode select switch such as heading to destination, velocity, time of arrival, etc.

In one embodiment, the plotter includes a high accuracy rapid hyperbolic line drawing system utilizing a specialized form of approximation for those charts which are not provided with hyperbolic navigation lines. It will be appreciated that if the stepping motors of the plotter were driven in an X-Y fashion without regard to maximizing the speed of the drafting exercise, it might take as long as an hour and a half to generate the hyperbolic grid lines on the chart. This is clearly an excessive amount of time and in one embodiment of the subject invention, a technique is provided in which the drafting time is considerably reduced. In this embodiment, the hyperbolic line which is drawn is approximated by drawing straight lines from a START point on the actual hyperbolic line to a midpoint on the actual line and then to a GOAL on the actual hyperbolic line. Prior to the lines being drawn, the straight line between START and GOAL is calculated. The deviation between the straight line and the midpoint on the actual hyperbolic line is then calculated. If this deviation is not excessive, then the lines between START and GOAL are drawn by drawing two lines, one from the START point to the midpoint and the other from the midpoint to the GOAL. Should the deviation be excessive, the midpoint of the actual line is made the GOAL and the process is repeated on a shorter segment of the actual line. After a given two line segment is drawn, distance between the START point and the new GOAL is doubled or otherwise increased. Assuming that the deviation limit is not exceeded, this permits the drawing of longer straight lines which approximate the true hyperbolic line. In this fashion, especially for shallow hyperbolic lines, the drawing speed is increased because of the ability to draw a smaller number of long straight lines as opposed to a larger number of short stubby lines.

Note, in an alternative embodiment any predetermined number of straight lines may be drawn from START to GOAL with the ends of each drawn line being located on the true or actual hyperbolic line.

In another embodiment, the so called base line extension "danger zone" is graphically illustrated by not printing the hyperbolic line grid in the danger zone. This grid safety zone, alerts the navigator to possible ambiguities in the readings from the hyperbolic navigation unit. For the LORAN case, in the area immediately along the extension of the base line between master and slave stations in a direction away from both master stations, there is a zone in which the LORAN set outputs the same number for two different locations on the earth surface which may be spaced apart by small amounts. While it is impossible for any hyperbolic navigation system to resolve this error on the basis of physical principals, it is possible to give the navigator warning so that having analyzed his track immediately prior to entering the danger zone, he can ascertain by dead reckoning which of the two points he is more likely to be at.

The base line extension is a line which represents a time difference reading equal to the coding delay. The coding delay is the time after a pulse from the master station reaches a slave station, for the slave station to emit a pulse. The danger zone is defined by a hyperbolic line pointing away from the master or slave station and representing a predetermined time difference, in which the hyperbolic line has a focus at the other station. A typical safe zone might be the 10 microsecond time difference line which would actually look like a very narrow hyperbolic line focused at and surrounding the slave station. In one embodiment, when drawing a hyperbolic line which is to cross the danger zone, a GOAL may exist within the area surrounded by the 10 microsecond line. To avoid drawing a line into the danger zone, the GOAL is redefined and moved closer to its starting point. In one embodiment, the GOAL redefined as exactly lying on the time difference line defining the danger zone and the hyperbolic grid line which is to cross the danger zone is then drawn exactly to the intersection of that line with the danger zone defining hyperbolic line. In this way the pen is prohibited from drawing grid lines within a predetermined danger zone.

A further feature of the subject system, is that when the location of a vessel is off-chart, its actual location is tracked through the utilization of counters, which counters in essence count the number of pulses generated when going from the initialized point to the actual location of the vessel. In prior art systems, no distinction is made between the pulse rate for the stepping motors of the plotter when the pen is on the paper as opposed to the pulses generated when the pen is directed to be off the paper. It will be appreciated that whether or not the pen is actuated, the counters are supplied with pulses so that the counter count actually reflects the position of the vessel whether or not the vessel is on the chart.

At this point it should be noted that these counters may also be used to keep track of vessel destinations and that the destination counters must be rapidly set to avoid substantial waiting period.

For initialization, it is often times necessary to count up the counters to the off-chart vessel or destination location rapidly, so that the operator does not have to wait for heading, range, time of arrival or latitude/longitude information. If the counters were clocked at the stepping motor rate, this might take as long as five minutes. This time lag is compensated for in the subject system by providing different rates of clocking when the vessel or destination is off-chart as opposed to when the vessel or destination is on-chart. Thus assuming that the pen is initialized at some on the chart and the vessel is actually off-chart, the pen is moved at the usual rate in a direction towards the point which represents the actual vessel location. At the point at which the pen encounters the edge of the charting surface, this occurance is sensed and the counters are thereafter clocked at a very fast rate to permit rapid initialization.

Thus one of the primary advantages of running the counters at a higher speed is when the vessel or its destination is off-chart. In order, for instance, to obtain time of arrival, course, range or latitude and longitude of the destination, it is important that the counters be quickly and rapidly set so as to reflect the off-chart destinations. In fact, almost all of the initializations of the plotter require that these counters contain the appropriate count prior to displaying any initialization data.

Another advantage to using a differential off-chart clocking rate is in the case of hyperbolic line drawing. If a GOAL for a given line is off-chart, it is important to run the corresponding counters at a high rate so that the START-GOAL line may be rapidly computed and the drawing process initiated so that the line drawing takes place in a minimum time. Likewise, when drawing the next line, it is useful to decrement the counters rapidly until the pen is on the paper, at which time the normal pen-drive may be used.

One further feature of the subject plotter is a velocity filtering feature in which TDs indicating a velocity clearly in excess of the vehicle's capability are used to produce pen movements which are limited to some maximum velocity, which may correspond to a vehicle's maximum velocity. This means that the pen track will ignore deviations generated by transients in the received TDs. Thus the pen will not be driven wildly and a smooth accurate track will be provided.

A still further feature of the subject plotter is that is marks an "X" or other indicia for an initial vessel position, a remote location or destination, thus to aid navigators in visualizing the navigational problem.

DESCRIPTION OF THE DRAWINGS

These and other features of the invention are more thoroughly set forth below in the detailed description of the examplary preferred embodiment and accompanying drawing of which.

DETAILED DESCRIPTION

Figure 1:
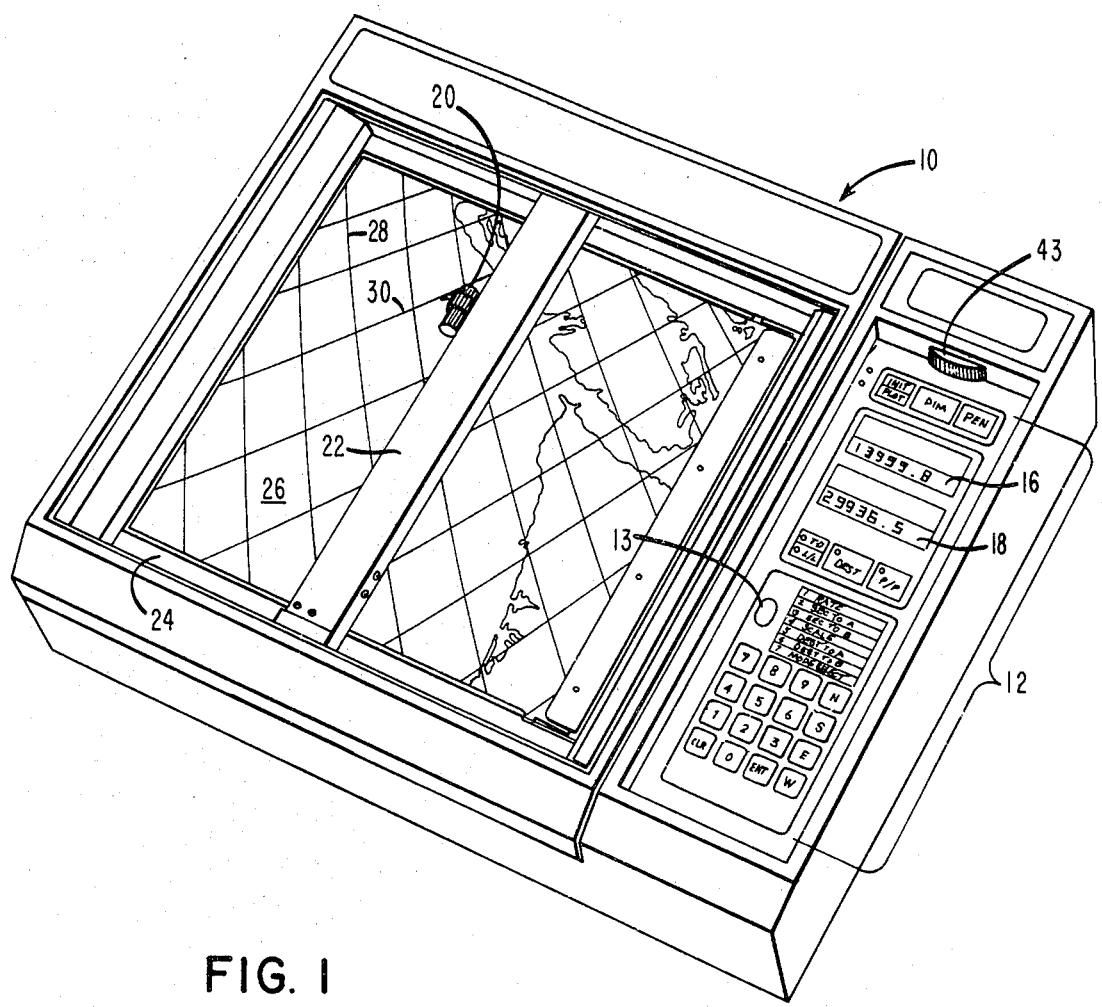
FIG. 1 is an isometric view of the subject plotter indicating the plotting mechanism and data entry keyboard.

Referring now to FIG. 1, a plotter 10 includes a data entry and display section 12 which includes a data entry keyboard 14 and an alphanumeric display which includes two sets of display windows 16 and 18. The use of two display windows, in normal operation, is for displaying either two sets of coordinates in terms of latitude and longitude or two sets of time differences in terms of the hyperbolic navigation signals or coordinates desired. To the left of the entry devices is an X-Y plotter in which a pen 20 is moved in a vertical direction and is carried by support 22 which is translatable in a horizontal direction on support 24. Support 24 is hinged at the rear (not shown) so as to enable the placing of a chart 26 or plain piece of paper beneath pen 20.

As illustrated, the chart may be over-printed with hyperbolic time difference lines 28 and 30 as will be described hereinafter.

Figure 2:
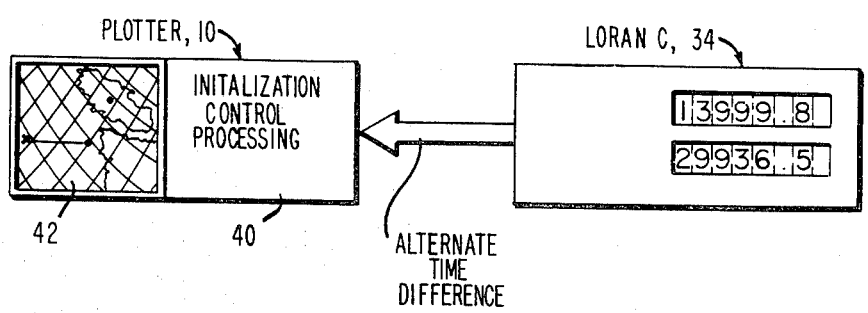
FIG. 2 is a block diagram illustrating the connection of the subject plotter to a hyperbolic navigation instrument such as a LORAN device.

As diagrammatically illustrated in FIG. 2, a hyperbolic navigation unit such as a LORAN C unit 34 is coupled to plotter 10. As illustrated plotter 10 is mainly divided into two sections, the first section being an initialization, control and processing unit 40 and a pen drive unit 42. The output of the LORAN C unit is conveniently alternate time differences which times differences are those which are received and detected by the LORAN C unit.

In one basic operating mode, after the hyperbolic navigation unit has locked on to the signal, the plotter is turned on by rotating a power thumb switch 43 to the left in which case the display 16 will read ±1888888. Display 18 will read ±1888888 also. The plotter is now in the lamp test mode. At this point, if it is desired to check the dimming features of the display, the DIM button is depressed. Successive actuations of the DIM switch will alternately dim and brighten the digital displays. The DIM switch is then set to the desired intensity. In one embodiment the plotter remains in this mode for about five seconds. Five seconds after turn on the plotter will automatically switch off the lamp test mode and will display the internally set chain rate in display 16. In one embodiment this would be 9960. At this time, a 1 will appear in Entry window 13. Using the N, S, E and W keys, the plotter pen 20 is positioned at the desired reference point. Up-down motion of the pen is determined by the PEN key. For example, if the vessel is to be moving to the East, it may be preferable to place the reference point at the left hand side of the chart. When the reference position has been set, the PLOT switch is depressed and then the ENT key is depressed. After approximately fifteen seconds, in one embodiment, display 16 and 18 will display present position. If it is desired to display latitude and longitude in place of the time differences, switch L/L is depressed. As soon as displays 16 and 18 display present position, the plotter is operational and ready to track the vessel. In this mode of operation, the plotter is plotting in the 10 nautical mile scale and the chart will represent an area of 10 square nautical miles. Note, depressing the P/P key results in a display of present position.

In terms of the optional modes of operation of the plotter, the following points out the different modes and capabilities and provides the detailed procedures for implementing them.

After the receiver has locked on, and after the illumination sequence has been performed, the internally set chain rate will be displayed in display 16. If it is desired to change the chain rate, the CLR key is depressed. The rate will be cleared from display 16. The keyboard is then utilized to input the four digits of the new rate. Thereafter, the N,S,E and W keys are utilized to position the pen as referred to hereinabove, with the depressing of the ENT key thereafter. After the depressing of the ENT key, displays 16 and 18 will display the two time differences that are displayed on the receiver. After the time difference readings have been displayed on the plotter, depressing the ENT key displays at display 16 a scale of 10 nautical miles which is preset in the plotter in one embodiment. The pen on the plotter, in one embodiment, will mark an "X" at the spot selected as the reference point and this reference point will be the vessel's present position on the chart. At this point in time the numeral 4 will be displayed in Entry window 13. If it is desired to change the scale, the CLR key is depressed and the display will be blank. The keyboard is then utilized to enter the desired scale. The nomenclature 100 refers to 10.0 nautical miles. The nomenclature 105 refers to 10.5 nautical miles and the nomenclature 1000 refers to 100.0 nautical miles. The scale is selected to be representative of the chart area in that a 15 nautical mile scale means that the chart represents a 15 nautical mile square.

When the new scale has been entered in display 16, the ENT key is depressed. At this point, both displays 16 and 18 will be blank and Entry window 13 will display the digit 5. At this point in the initialization procedure corresponding to Entry 5, the operator may enter into the plotter up to nine different destinations or way points. These destinations may be entered either in time distance coordinates or latitude/longitude coordinates. In order to enter time difference coordinates, the operator first utilizes the keyboard to enter TDA of the destination. When TDA has been correctly entered, the ENT key is depressed. After the display, the digit 6 will appear in Entry window 13.

Should latitude and longitude coordinates be desired, the L/L switch is depressed with the latitude being entered first by the depression of the ENT key. Thereafter, the keyboard is utilized to enter TDB of the destination. After the entry of the TDB coordinate, the pen will move to the destination and mark an "X" on the chart. After this process, the Entry window will display the digit 5 again indicating that a second destination may be entered in the same manner as described above. If no further destinations are desired, the ENT key is depressed again. After having entered the destinations, the ENT key is pressed to provide a digit 7 in Entry window 13. When digit 7 is displayed in the Entry window, display 16 will display a series of six zeros. The first two zeros refer to the number of grid lines to be drawn by the plotter for each secondary. The second set of zeros refers to the spacing in microseconds between each grid line. The third set of zeros refers to filtering and averaging functions as follows. 00 refers to velocity filter and the averaging. 01 refers to averaging only. 02 refers to velocity filter only. 03 refers to raw data without velocity filtering and averaging. The provision of 000000 refers to default conditions in which no grid lines are to be drawn and in which both filtering and averaging functions are in effect. If this is desired, the entry key ENT is depressed and the plotter will go into the plot mode. At this point the plot indicator will be illuminated and the displays will indicate present position. The pen will return to the reference point which is the present position and the plotter will track the present position of the receiver. If, however, the operator desires to have grid lines drawn before going into the plot mode, or if the operator desires to have only the velocity filter in operation, the following steps are performed. Assuming that it is desired that three grid lines be drawn with spacing between lines to be 10 microseconds and that the velocity filter is the only filter to be in operation, then the CLR key is depressed to clear all zeros from the display. Using the keyboard 03 10 02 is entered and finally entered by depressing the ENT key. At this point, displays 16 and 18 are blanked out and the pen will return to the reference point where it will start to draw the lines required. After all the lines have been drawn, the displays will be blank, and after a few moments the present position will be displayed, the pen will return to the present position, the plot indicator will be illuminated, and the plotter will go into its plot mode.

Any time during the plot mode the operator may monitor the distance and heading to the preset destination. In order to do so, the DEST switch is depressed at which time the display will show in display 16 the distance to the destination in nautical miles. Display 18 will display the heading to the destination in degrees. In one embodiment, the reading will be with respect to true north. Note that the distance and heading will be that of the first preset way point or destination if more than one has been preset. As a vessel approaches to within one half mile of the preset destination, the plotter will sound an audible alarm, and the display will flash. To shut off the visual and audible alarm, the DEST switch is depressed and this is followed by the depression of the CLR key. This operation also clears the plotter to display the next destination assuming more than one has been preset. To shut off the audible alarm only, the DIM key is depressed. Thereafter, the alarm will be actuated when the second destination is reached.

As mentioned hereinbefore, remote initialization permits the operator to use as a reference point any known location within the chain that is at a distance from the present position. In order to remotely initialize this system with the receiver locked on to the TDs of the vessel's present position, after the test mode, the plotter will display the internally set GRI rate. If the plotter's rate is not the same as the receiver's, the CLR key is depressed followed by the utilization of the keyboard to enter the correct chain rate. The operator then utilizes the N, S, E and W keys to locate the pen at the center of the plotter chart because it is intended to operate the vessel within a 10 nautical mile radius of the remote point. Thereafter the ENT key is depressed and the plotter will be blank for 10 seconds. Then it will display the present position LORAN coordinates. At this point in time, Entry window 13 will display the character 2. In order to enter the coordinates of the remote location, the CLR key is depressed and the keyboard is utilized to enter first TDA. This is displayed in Entry window 13 displays character 2. Thereafter, the ENT key is depressed with the display now entering the TDA coordinate of the remote location. Entry window 13 then displays character 3. Thereafter the keyboard is utilized to enter TDB and the ENT key is depressed. The display will then display the coordinates of the remote location. At this point, Entry window 13 will display character 2. Assuming the coordinates are correct, ENT key is depressed and the pen will draw an "X" representing the point in the center where the pen had been positioned. Display 16 will the display 100 and Entry window 13 will display character 4. Since it is desired to operate the vessel within a 10 nautical mile radius of the remote initialization point, the 10 nautical mile scale displayed must be changed to a 20 nautical mile scale as follows. First the CLR key is depressed and the diplay 16 will be blank. The keyboard is then utilized to enter 200 and Entry window 13 will display character 4. Thereafter, the ENT key is depressed and Entry window 13 will now display character 5. With 5 displayed in the Entry window, the keyboard is utilized to enter TDA of the remote point. In this step and in the following step the operator is entering the coordinates of the remote point as a "destination". Thus, in sequence the ENT key is depressed. Thereafter TDA is displayed and Entry window 13 displays character 6. With character 6 displayed in the Entry window, the keyboard is utilized to enter TDB at the remote point. After the depression of the ENT key, Entry window 13 will display reference character 7. If it is not desired to draw grid lines, the ENT key is then again depressed. At this point the plotter will automatically go into the plot mode. It will be appreciated that the pen will attempt to move to the vessel's present position. Since the vessel's present position is beyond the scale of the chart, the pen will lie against the edge of the plot or chart at a point at which the moving vessel will enter the chart area. The plotter's ability to display distance and heading to destination can be utilized as an aid in directing the vessel to the remote initialization point.

It should be noted at this point that the remote initialization point may be a fixed object on the chart at which point the pen is placed, as opposed to the center of the chart.

There may be occasions when, because of the vessel's location within the LORAN chain, that the receiver present position display is incorrect by a few microseconds. While the correction of this error may not be critical to plotter operation by fishermen or to the majority of plotter users, there is a method for correcting such errors for those users who require the greatest degree of accuracy. Scientific users, such as geological surveys units, national fisheries and off-shore technology people, will find the capability of the subject plotter for entering corrections from 0.1 to 9.9 microseconds a valuable feature. In order to enter TD corrections, the following steps are performed. When the rate display appears, the ENT key is depressed to wait for the TD display. The operator then determines from the display the value and direction of change required to obtain a correct reading. Thus if TDA is 14144.4, an incorrect reading, and the correct reading is 14146.4, a correct reading, then the difference is +2.0. If the TDB reading, which is incorrect, is 25898.0 and the correct reading is 25896.5, −1.5 difference is indicated. In short, the operator must add 2.0 microseconds to TDA and must subtract 1.5 microseconds from TDB. In order to do this, the CLR key is depressed and the display will go blank. Utilizing the keyboard, 999999 is entered. This is the code for entering corrections. Thereafter the ENT key is depressed. The display at this point will be blank and the Entry window will display the character A. The keyboard is then utilized to enter the correction for TDA which is +2.0 microseconds. For positive entry, the sign must be entered. In this case, the character 20 is entered and the ENT key depressed. Entry window 13 will display a lower case letter "b" so as not to be confused with the digit "8". The keyboard is then utilized to enter corrections for TDB which is −1.5 microseconds. Utilizing the "S" key for the minus sign, the entry should be S15. Thereafter the ENT key is depressed. If for any reason the operator wishes to remove the added corrections, it may be done as follows and only when the plotter is in the Entry 2 stage. This is done as follows. Depressing the CLR key and Entry code 999999, is followed by depressing the ENT key. At this point TD display will now be the same as that displayed on the receiver.

Figure 3:
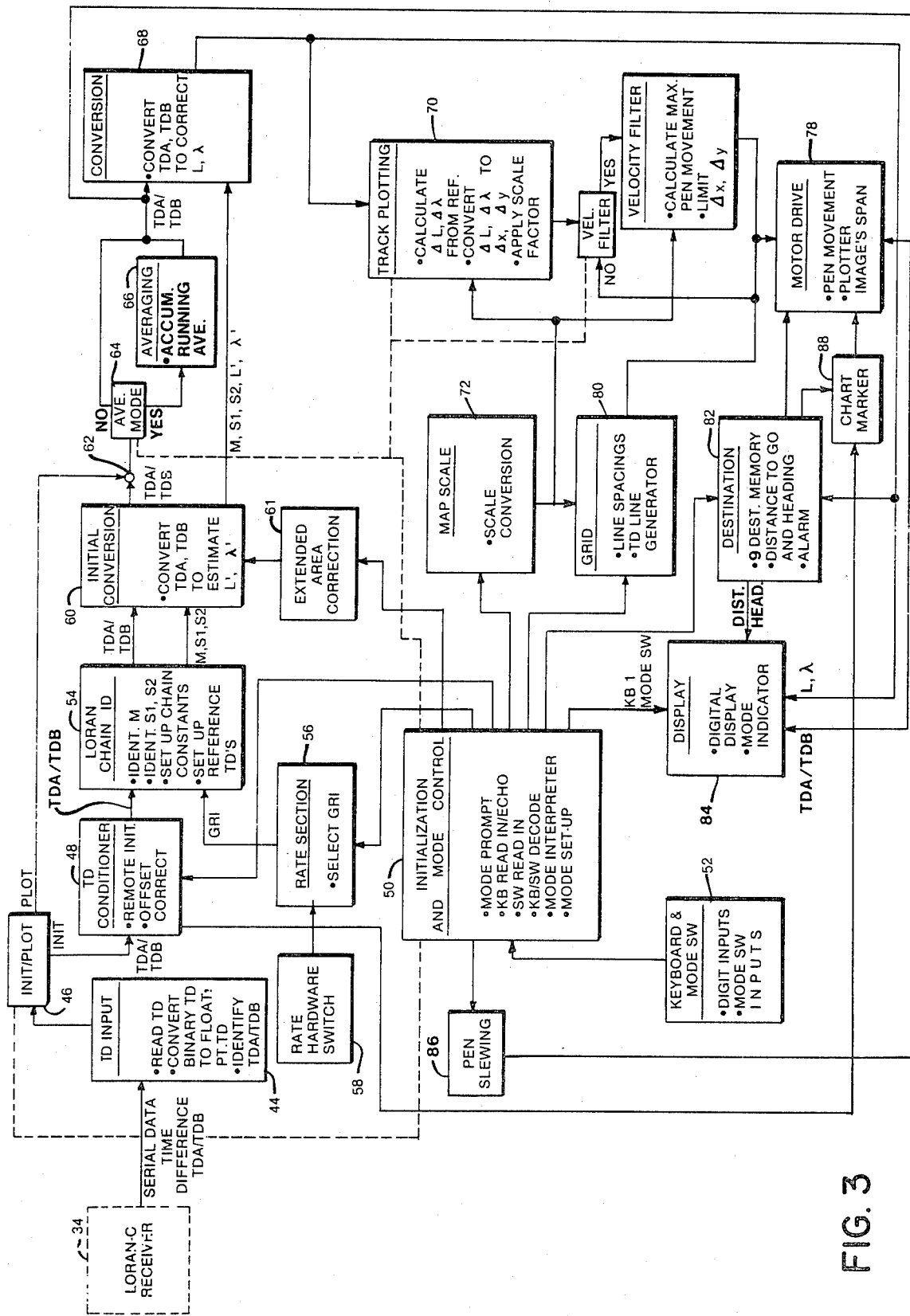
FIG. 3 is a functional block diagram of the subject plotter.

Referring now to FIG. 3, the initialization, control and processing portion 10 is illustrated. In this diagram a LORAN C receiver applies serial time differences (TDA) and (TDB) to a TD input unit 44, the functions of which are to read the incoming TDs, convert the binary TDs to floating point binary TD signals and to identify which of the signals, TDA or TDB is being read.

Initially, when a serial time difference data is coupled to TD input unit 44 a first signal is identified and the unit then waits until a second signal is received which signal is at least 10,000 microseconds spaced from the first signal. Upon such an occurrance the smaller of the two signals is identified and given the nomenclature TDA whereas the larger is given the nomenclature TDB. Thereafter in the running of the plotter any incoming signals are compared with TDA or TDB to determine if they are within 5,000 microseconds of TDA or TDB. If they are within 5,000 microseconds of TDA or TDB they are assigned the TDA or TDB nomenclature otherwise they are rejected.

The output of unit 44 is applied to an initialization or plot selection unit 46, controlled by an initialization and mode control unit 50. If an initialization routine is desired, the output of unit 46 is applied to a TD conditioner unit 48, the purposes of which are to condition the TDA and TDB signals for offset correction or to input remote initialization TDs. This unit is under the control of initialization and mode control unit 50 which is in turn controlled by a keyboard and mode switch 52.

With respect to remote initialization, the pen on the plotter is moved to a point on the charting surface which represents either a known feature of the chart or represents a predetermined position on the chart such as its center. Secondly, the coordinates of this point are entered via initialization mode control unit 50 and keyboard 52. In one embodiment, this may simply be in terms of hyperbolic time difference signals TDA or TDB. The TD conditioner unit 48 therefore, either selects the TDA or TDB representing the present position as it comes from LORAN C unit 34 or the remote initialization position as generated via units 50 and 52.

With respect to off-set correction, it is often times desirable to do a gross correction on the time difference signals due to certain anomalies in the given area. These off-set corrections are the so-called secondary phase corrections which occur because of differences in propagation speed of the electro-magnetic signals from the master slave stations. These off-set corrections are often times published by the Coast Guard or can be measured in some other fashion. The outputs of the TD conditioner unit are referenced TDs. These TDs are applied to a LORAN chain identification unit 54 which identifies the masters, identifies the slaves, sets up chain constants and sets up reference time differences. As an input to the LORAN chain identification unit, the group repetition interval (GRI) rate is provided from a rate selection unit 56 under control of either a rate hardware switch 58 or the output of initialization and mode control unit 50.

With respect to the reference TDs, the reference TDs are those TDs either representing the initial present position of the vessel or they represent the remote initialization TDs. It will be appreciated as the description of this plotter progresses that all pen movements are referenced to these referenced TDs in terms of the number of $\Delta X$ and $\Delta Y$ pulses necessary to represent the present position with respect to the reference position. The reference position thus carries the coordinates 0,0.

With respect to identifying a master station, the identity of the master is obtained simply by having the group repetition interval set in by the rate hardware switch 58. A read only memory (ROM) stores the locations of all master stations in terms of the group repetition interval since there is only one chain for each group repetition interval. The identity of the slave or secondary stations is then obtained by comparing the time difference of the secondary to the coding delay in another ROM, with the secondaries being uniquely defined by this relationship within the chain identified by the GRI. Having identified the master and two slaves it is then possible to set up certain chain constants also read out from a ROM which include the latitude and longitude of the master and slave stations previously identified and the coding delays for each of the slave stations. The output of the LORAN chain identification unit are the reference TDA/TDB readings as well as information concerning the master and slaves. This information is coupled to initial conversion unit 60 which converts the reference TDA and TDB numbers to estimated latitude and longitude coordinates L' and $\lambda'$ for the Campbell routine carried out by conversion unit 68.

The purpose of the initial conversion routine is to provide latitude and longitude with a simplified routine which requires only the TDA and TDB provided by the LORAN chain identification unit and information with regard to the master and slaves. This simplified routine does not require such additional information as a latitude and longitude in the vicinity of the actual present position which is ordinarily required for exact location calculations. Thus the operator of the subject plotter need not know his location in order for the plotter to operate automatically. The reason for the initial conversion is as follows:

It will be appreciated that in any hyperbolic navigation system, there are potentially two points on the earth's surface at which the same readings are obtained. Since the operator of the plotter obviously knows for instance that he is off the coast of Massachusetts as opposed to being in Cleveland, Ohio, this fact is drawn from a ROM and ambiguity-free estimated latitudes and longitudes are generated which are then used in the successive approximation conversion of unit 68, which utilizes the Campbell Routine. This will be discussed later. The simple initial conversion routine is now discussed.

The difference between this routine and the routine performed in conversion unit 68 is that in the initial conversion the earth is assumed to be spherical, as opposed to an oblate spheroid. This facilitates a non-iterative solution.

The routine is written to perform the following function: given a pair of LORAN time differences TDA and TDB, compute with their associated LORAN chain statistics, the position associated with the TDs in geographic (lat/long) coordinates. The inputs are the TDAs and TDBs of the LORAN reading in units of 0.1 microseconds; and the associated LORAN chain statistics, e.g.: master station lat/long; A-secondary station lat/long; B-secondary station lat/long; coding delay between master and secondary A; and, coding delay between master and secondary B.

The output is the approximate position (lat/long) in geographic coordinates.

The LORAN time differences TDA and TDB, received at the LORAN receiver's position are converted to geodesic arcs (in radians), and spherical equations are used to solve for the latitude and longitude coordinates of the LORAN receiver position.

The geodesic computations used in this routine are performed using the subroutines developed by Emanuel M. Sodano "General Non-interactive Solution of the Inverse and Direct Geodesic Problems," Research Note 11, U.S. Army Engineer, Geodesy, Intelligence and Mapping Research and Development Agency, Fort Belvoir, Va., April 1963. Navigation Equations are taken from "Navigation and Nautical Astronomy" by Commander B. Dutton, United States Naval Institute, Annapolis, Md.

Should the display of estimated latitude and longitude be such as to place the vessel in a so-called extended area danger zone, the operator can override the initial conversion at unit 61 and can then enter his correct estimated latitude and longitude. This solution probably occurs only 2% of the time. The operator knows that he is in an extended area danger zone if the plotter starts plotting in a direction other than the direction the operator knows he is going. This danger zone is fully described in connection with FIGS. 6–10. Thus while there may be ambiguous time difference readings, if the vessel starts out in the extended area danger zone, the operator can provide that there are no ambiguous estimated latitude/longitude coordinates by entering his estimated latitude and longitude.

This in part explains why the plotter for the hyperbolic navigation unit plots in terms of latitude and longitude as opposed to plotting in terms of time difference coordinates. Other reasons for utilizing the conversion from TDs to latitude/longitude are that the system automatically has a "north up" direction and that positions are uniquely specified in terms of latitude and longitude without further calculation, as opposed to the situation in which many further conversions would have to be utilized if TDs were not converted. This makes destination, location and other calculations considerably easier since the conversion from TDs to latitude/longitude is done only once for a given destination or present position.

Prior to the Campbell conversion, TDA/TDB information from the initial conversion unit or direct read TDs from unit 44 is applied through an OR gate 62 to a switching unit 64 which switches in an averaging unit 66 is desired. The averaging unit is by-passed when the reference TDA/TDBs are first applied. The output either averaged or unaveraged is a TDA/TDB signal to a conversion unit 68 to which is also supplied the information concerning the masters, slaves and estimated latitude and longitude from initial conversion unit 60.

The purpose of conversion unit 68 is to more perfectly convert TDA/TDB latitude and longitude. In order to do this, the conversion unit 68 operates to correct latitude and longitude outputs in a successive approximation routine called the Campbell Routine which is available from the Naval Oceanographic Office IR NO. N-3-64, entitled, LORAN to Geographic Conversion and Geographic to LORAN conversion June 1964, (Reprinted 1968). In this routine, the first estimate of the latitude and longitude are provided from the initial conversion unit 60. These first estimates are used to convert the reference TDA and TDBs to latitude and longitude. Thus the output of conversion unit 68 is, in the first instance, the latitude and longitude of a reference position. After iterative processing, this becomes more correct as the conversion routine loops through over several cycles. However, the first numbers which are available from the conversion unit are the numbers representing the latitude and longitude of whatever reference position is chosen. Thereafter, the outputs from this conversion unit are the latitude and longitude of the present position of the vessel as the vessel moves. During this portion of the plotting cycle, the initialization/plot switch 46 is switched such that the time difference signals from the LORAN receiver as converted to floating point are applied either through the averaging unit 66 or to conversion unit 68. Conversion unit 68 converts the real time TDA/TDB signal to corrected latitude and longitude signals which are then applied to the track plotting unit 70. Track plotting unit 70 is under the control of the initialization and mode control unit 50 such that initially the numbers from conversion unit 68 are taken to be the reference coordinates, whereas in the plot mode, also controlled by initialization and mode control unit 50, the numbers from the conversion unit 68 are subtracted from the reference coordinates thereby they generate a $\Delta L$ and $\Delta \lambda$ which are the converted into $\Delta X$ and $\Delta Y$ signals which are utilized in driving the motor drive unit to be described. Unit 70 also applies a scale factor to the $\Delta X$ and $\Delta Y$ signals appropriate to the particular scale desired. This of course relates to the scale of the chart utilized under the plotter or to any scale set by the user when plain paper is utilized. Default scale conditions are utilized in the event that the user does not wish to cancel them. These scale conversion numbers are generated in map scale unit 72 which is under control of the initialization and mode control unit 50, and may merely be a multiplication factor for multiplying the $\Delta X$ and $\Delta Y$ signals to bring them into the appropriate scale.

The output of the track plotting unit is applied to a velocity filter selecting unit 74 which connects the output of track plotting unit 70 to a velocity filter 76 when desired. It is the purpose of this velocity filter to calculate the maximum pen movement allowable and to limit $\Delta X$ and $\Delta Y$ in accordance with this calculation. This prevents wild pen movements due to erroneous data. In general, the pen movement is set so as not to exceed that associated with the maximum speed of a vessel. The output of the velocity filter unit is applied to a motor drive unit 78 which will be more fully described in FIG. 11. If no velocity filtering is required, the output of the track plotting unit 70 is applied directly to motor drive unit 78.

Should it be desired to superimpose hyperbolic grid lines over the charting surface, this is initiated by a grid drawing unit 80 which results in the generation of signals suitable for TD line generation, given the appropriate line spacing and the appropriate map scale. Line spacings and map scale or information is coupled to the grid drawing unit from initialization and mode control unit 50 and the map scale unit 72. The functions of this unit are described in connection with FIGS. 5–10.

The output of conversion unit 68 is also applied to a destination information unit 82 into which may be entered a number of destinations via initialization and mode control unit 50. This unit computes the distance to the destination from the present position of the vessel or vehicle and also the heading from the present position to the indicated destination. In one embodiment the destination unit also generates an alarm signal when the vessel is within a predetermined distance of its destination. The output of the destination unit is applied to a display unit 84 which displays distance to destination and heading as well as any other information which is dictated by the initialization and mode control unit. Thus display 84 may display TDA and TDB readings or may display latitude and longitude as selected by the initialization mode control unit.

As part of the scribings which the plotter can produce, the plotter has the added feature of being able to mark and X at either an initialized point or a destination and this is accomplished as far as initialization is concerned as follows: With respect to remote initialization a pen slewing unit 86 provides motor drive unit 78 with the appropriate signals to move the pen to any desired location on the charting surface which is defined by the depression of north, east, south and west switches in keyboard 52. Upon arriving at the desired location, a chart marker 88 unit is actuated so that the motor drive unit is driven such that the pen draws an "X" at the spot at which the pen resides. Should there be no remote initialization the pen is initially slewed to the point on the chart, which is indicated by the signals from the LORAN C receiver. An "X" is drawn at this point by actuating the chart marking circuit after the pen has been slewed to this initialization point. In other words, for initialization, an "X" is drawn wherever the pen is left after actuating the N, E, S and W switches.

With respect to destinations, these too may be recorded on the chart by calling out from the destination unit the coordinates of the particular destination and by driving the pen to this destination and then actuating the chart marker to mark an "X".

It will be appreciated that the utilization of "X" as the denominator of the pen position is one of convenience, since it is exceedingly simple to drive a pen in two orthogonal slanted directions to make a mark on the paper. Alternatively, of course, a program could be devised to draw a circle around the pen position but this, of course, would require an order of complexity not generally warranted.

Referring now to FIGS. 4A through 4G, the routine described depicts a step by step operation of the plotting unit as carried out by the plotter of FIG. 3.

As illustrated, first the machine is started and sets up a stack vector. The stack vector refers to a number of memory locations that are used to keep track of all functions that are being performed in the plotter. Next, a floating point register is initialized for floating point operations. The information that is coming in from the LORAN C to the plotter is in terms of binary data. All calculations performed within the plotter are done in floating point operations. Before going ahead and using the floating point operation package, a set of initial conditions must be set up. The next process step is to clear the RAM memory which is a series of memory locations within the plotter that are used as scratch pad memories to do calculations and to store data. When the plotter is started by applying power, all of these memories are cleared.

The next step is the lamp test. This refers to a test which assures that all portions of the plotter are in operating condition. This is indicated by the number 8 appearing at all display locations, indicating that all segments of the display are working. The routine then calls for a $TD_{in}$ step. The $TD_{in}$ package consists of knowing when the LORAN C receiver will send a TD over to the plotter. This step sets up all the requirements so that the TDs coming in from LORAN C can be accepted, received and stored. In this step, an interrupt is set up so that the plotter functions can be interrupted pending proper TDs. Next, the TDs are read in from the LORAN C receiver. The next step is the CALL TDLPI step to determine which of the TDs is larger and also to determine if the same TD is being read. Thus, this routine decides whether the TDs are correct numbers or not. It will reject TDs that are not correct. It will then recognize and identify whether the first TD in is TDA or TDB. The criteria for determining whether there are in fact two TDs is that there should be at least 10,000 microseconds difference between the two. If the TDs are less than 10,000 microseconds apart, then they are either the same TD or they are wrong. The unit then decides which is the smaller of the two and displays it as TD1. This number is also established as the binary reference TD1RB. Thereafter, TD2RB is established as a binary reference.

The next step is the CALL KB GRI routine to recognize the GRI. The GRI is read from the hard wired switches within the plotter or it reads in a keyboard selected GRI. Thereafter a pen slewing is allowed to the desired position, either a reference position or the present position. At this point, an INIT/PLOT flag is generated.

The next step is the inhibit INIT/PLOT switch. This keeps the operator from requesting the default initialization after the first entry.

The next step is the CALL KRONK step in which the display is blanked and the conversion from binary TDs to floating TDs is accomplished.

The next step is the CALL STASEL step, which identifies the coordinates of the master and slave, the GRI and TD1, TD2.

Figure 4A:
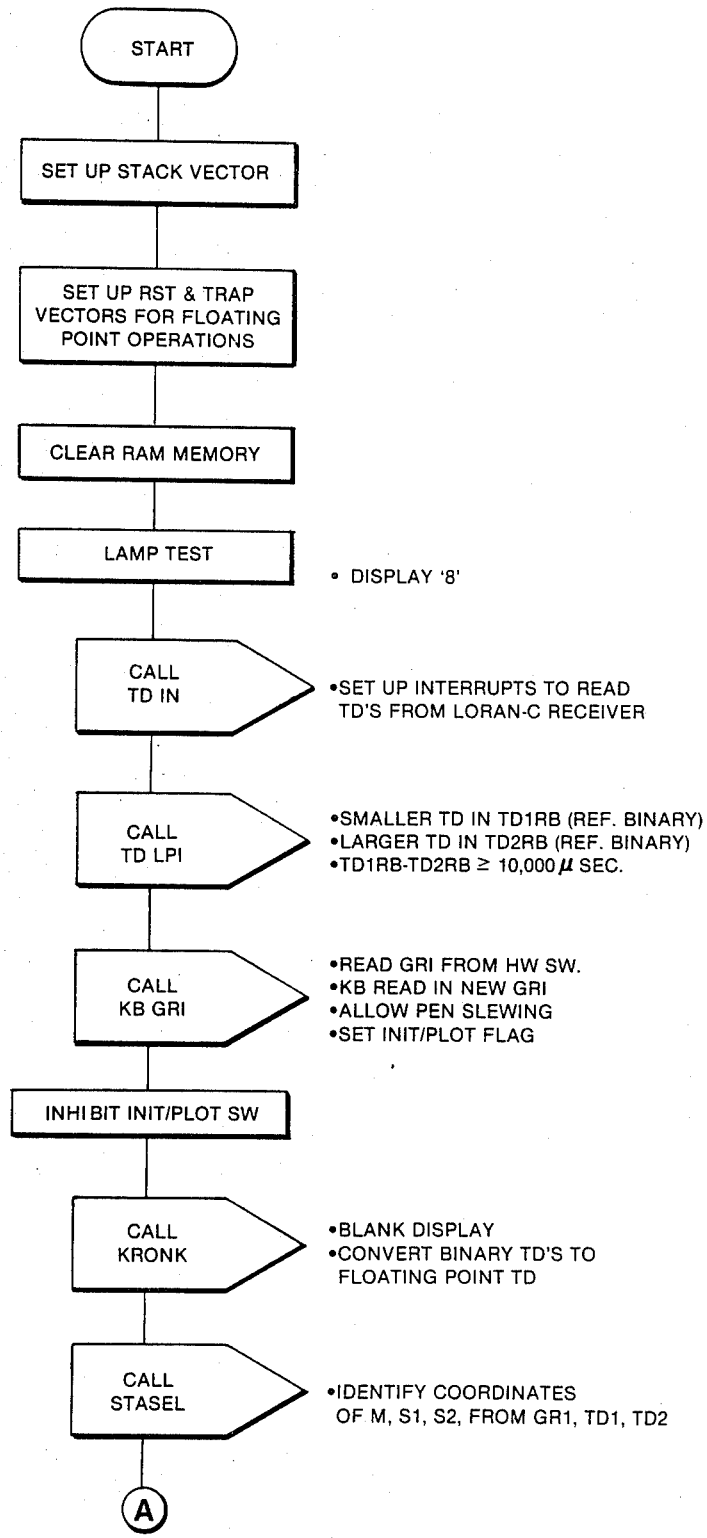
FIGS. 4A through 4G are flow charts describing the operation of the plotter illustrated in FIG. 3.
Figure 4B:
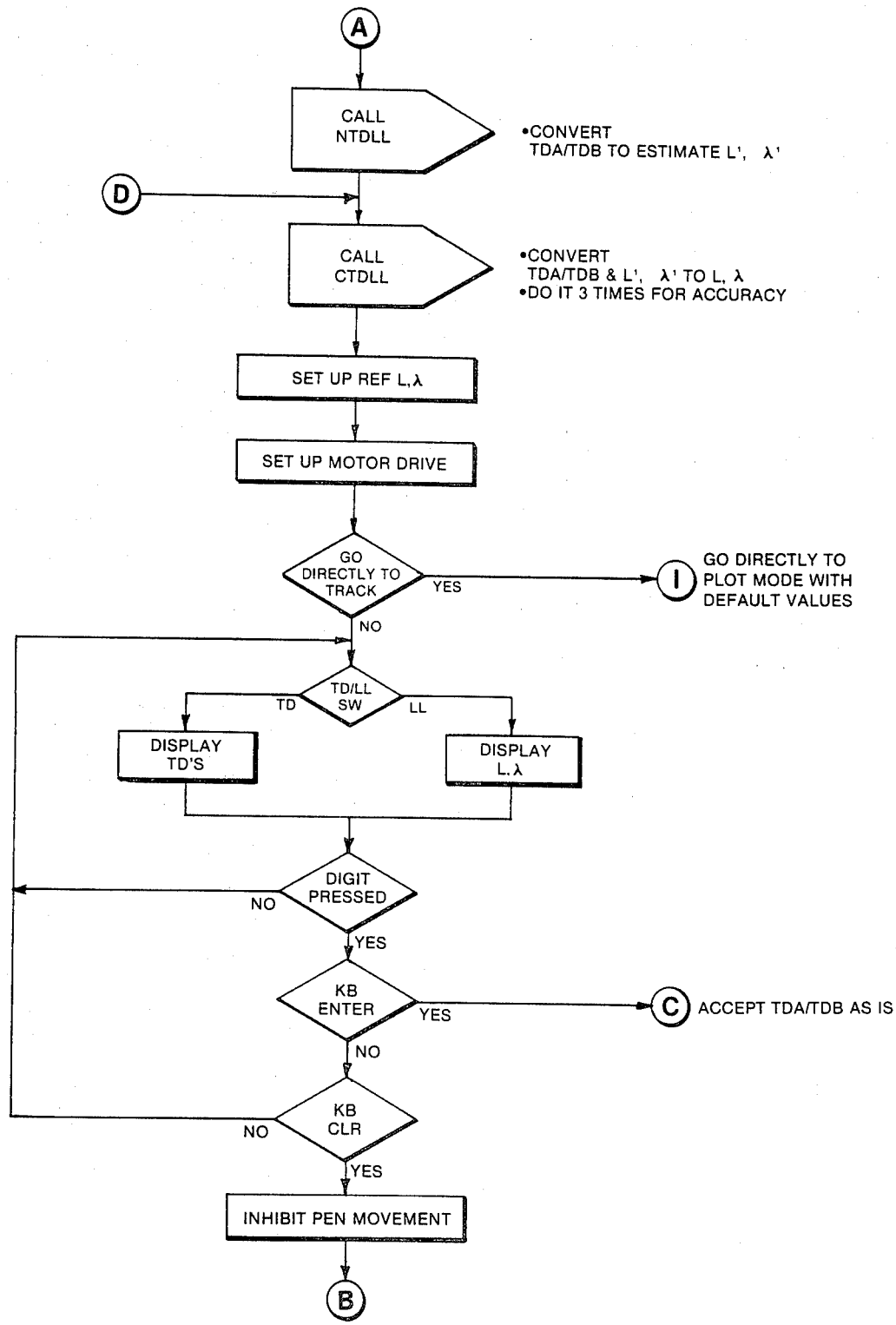

Referring to FIG. 4B, the next step is the CALL NTDLL step which converts TDA and TDB to estimated longitudes and latitudes. New estimated longitudes and latitudes may be set up (see FIG. 4C) and entered at this point at D. The next step is the CALL CTDLL step in which TDA, TDB and the estimated longitudes and latitudes are converted to corrected numbers. This is done iteratively three times for accuracy. The next step is to set up reference longitudes and latitudes. After having set up the reference longitudes and latitudes, the motor drive unit is set up which refers to setting all counters to zero. At this point, one can go directly into the track mode (cf I FIG. 4E) which means going into the plot mode with all of the default values mentioned hereinbefore (FIG. 4E), with an "X" being marked at the present position.

Alternatively, the operator can override the default conditions and go into different kinds of modes that the plotter would accomplish. To give the operator a display of what is happening, the plotter can take whatever current TDs or latitude and longitude (lat/long) has been converted previously and display it. This selection takes place at TD/LL SW and the appropriate display is actuated. If a digit is pressed at this time, then a number of things can happen. If the keyboard enter switch is then depressed, KB ENTER, it accepts the TDA and TDB as is and a signal at C (FIG. 4D) causes an "X" to be drawn at this location. If not, then with a keyboard clear, KB CLR, actuated there is an inhibition of pen movement.

With KB CLR there are three modes of operation which the operator can now choose. He can do offset corrections; he can do a remote initialization; or he can go into an extended area mode.

Figure 4C:
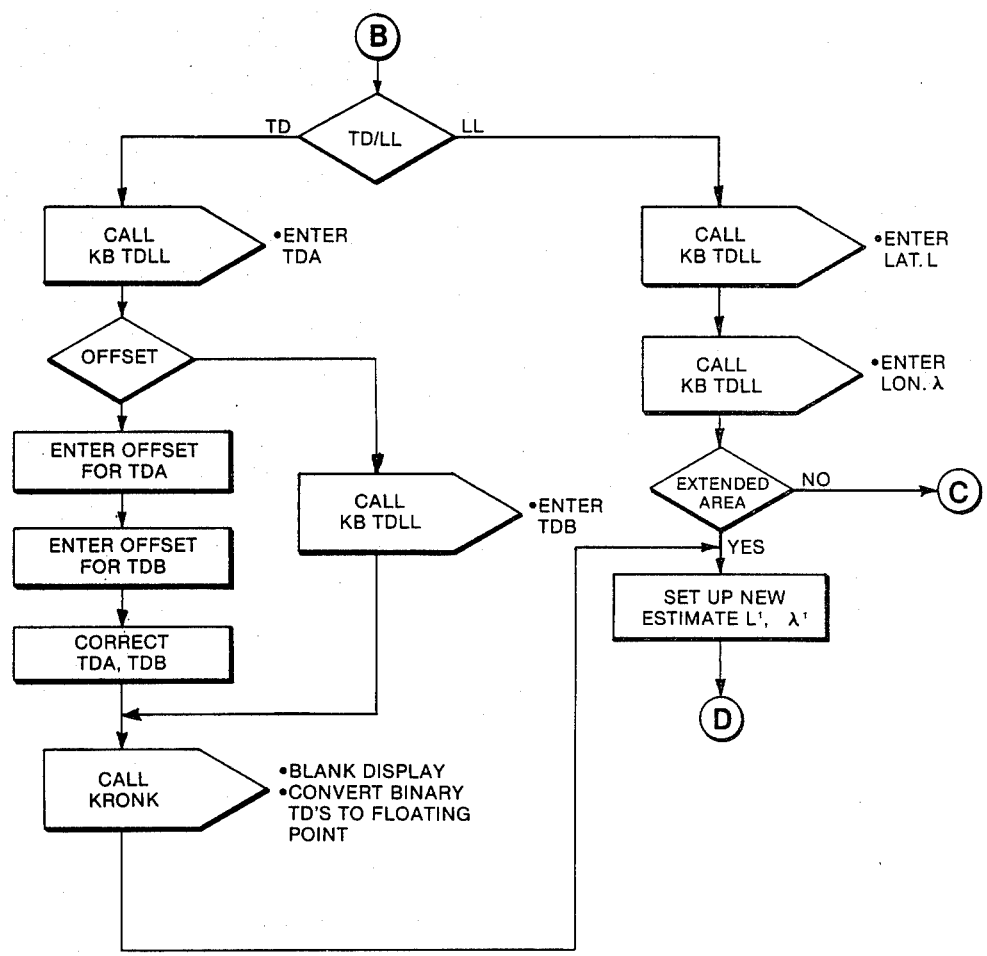

If the operator decides not to accept the TDs as displayed, he may depress the clear key. At this point, the display goes blank and he will then be permitted to enter his first entry. In order to choose a remote initialization, for instance, the operator would then enter the latitude and longitude or TDA and TDB as indicated in FIG. 4C.

If the operator wishes to put in offset corrections, he would actuate TD/LL and enter the 99999 code mentioned above as the TDA code. Since a TDA in actuality could not have the 99999 value, this indicates to the machine that the operator wishes to enter an offset value. Thereafter, at the CALL KB TDLL step, TDA is entered. Thereafter, the CALL KB TDLL step enters TDB. Thereafter, offsets are entered for TDA and TDB and these quantities are thereafter corrected. This is followed by a CALL KRONK operation which blanks the display and converts to floating point. The floating point output is supplied to set up new estimated latitude and longitudes as illustrated.

If there is an extended area correction to be made, TD/LL goes to CALL KB TDLL to enter the operator's best estimate of his latitude. The next step is the CALL KB TDLL step to enter the operator's best estimate of his longitude. Assuming that an extended area correction is necessary, sets up a new estimated latitude and longitude and goes back to D of FIG. 4B.

Figure 4D:
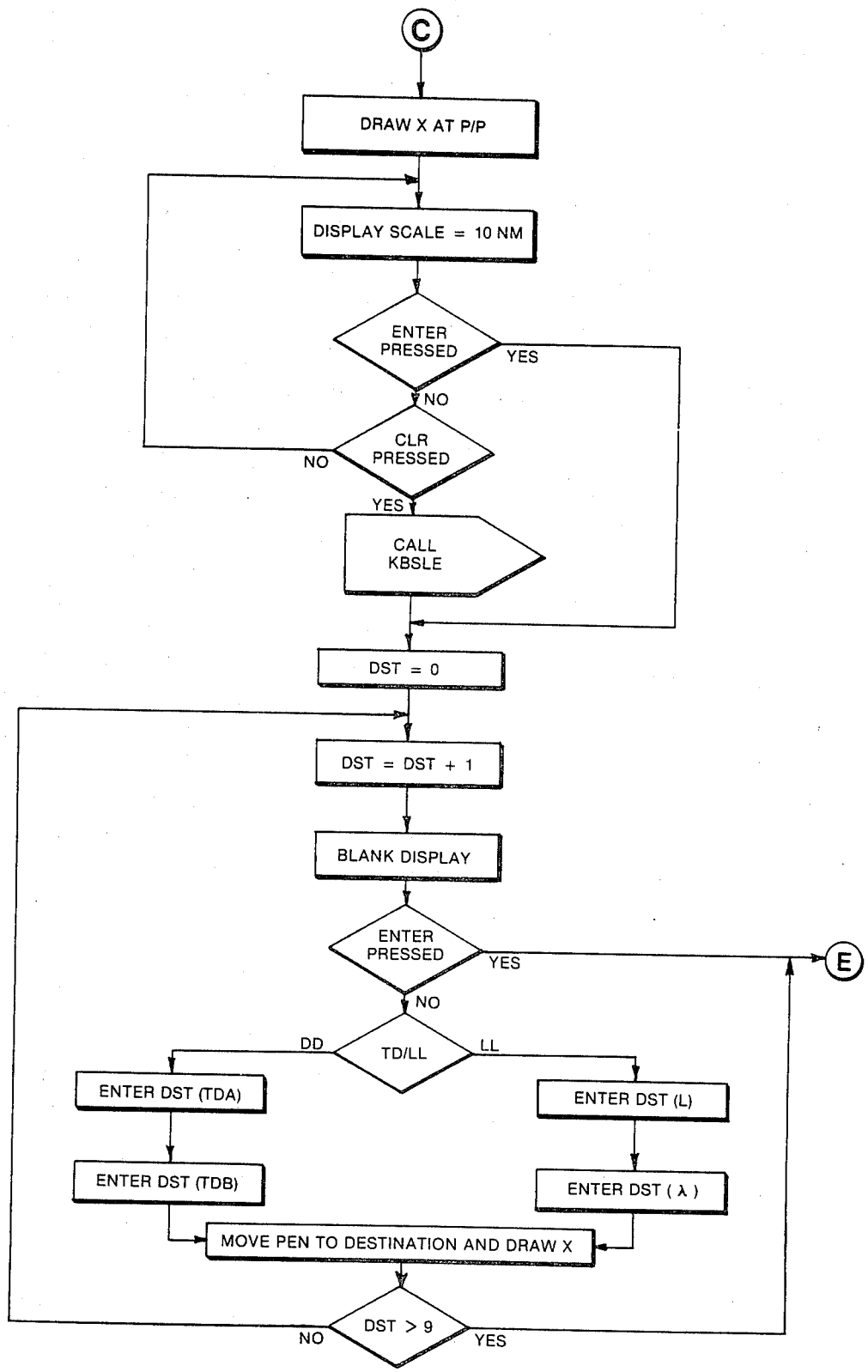
Figure 4E:
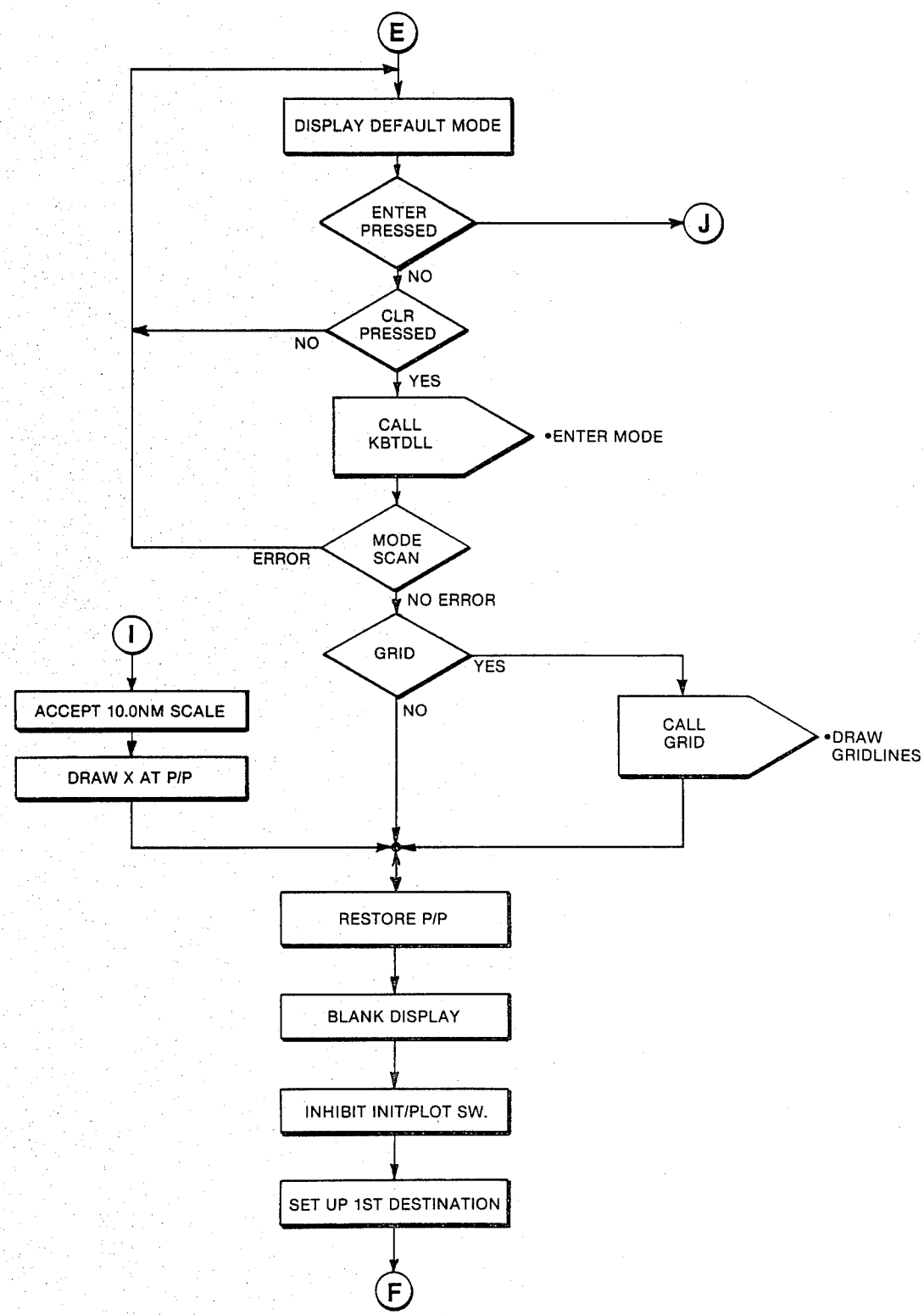

Referring now to FIG. 4D, after this previously described part of the initialization, an "X" is drawn at the present position. Then the default scale is displayed and the plotter waits for an entry from the keyboard, ENTER PRESSED, to see if the operator wants to maintain that particular default condition. The default condition may be accepted or not as desired. If not accepted, the clear key is pressed and a CALL KB SLE step is performed to set up the new scale. Upon acceptance of whatever scale conditions are required after CALL KB SLE, the machine then goes into a destination routine. This starts by setting the destination counter to 0, e.g. DST=0 and then incrementing this counter (DST=DST+1) for every new destination. The display is blanked. If no destination is entered, ENTER PRESSED indicates a default mode display at E (FIG. 4E). If not pressed, then coordinates of a first destination are entered either in terms of TDA/TDB or lat/long. Upon entry, the pen is moved to the destination and an "X" is drawn on the chart.

After the required number of destinations have been entered, as illustrated in FIG. 4E, assuming that the operator does not want to draw any grid lines, he may want to choose velocity filtering or an averaging mode. If he accepts the default mode then the operator simply presses the enter button again and goes directly into plot at J. If he doesn't want to accept the default mode and wants to draw a grid or take out either the velocity filtering or averaging or both of them, he presses clear CLR PRESSED, and then goes through the CALL KB TDLL routine to enter the mode which may call into play the grid drawing routine as in CALL GRID at which point the grid lines are drawn. After the grid lines are drawn, the plotter then restores the pen to the present position as illustrated and the display is blanked. There is then an inhibiting of the INIT/PLOT switch and the plotter sets up the first destination, if there is one indicated. Note, if there is an error in the mode selection in the MODE SCAN step, the default mode is displayed.

Figure 4F:
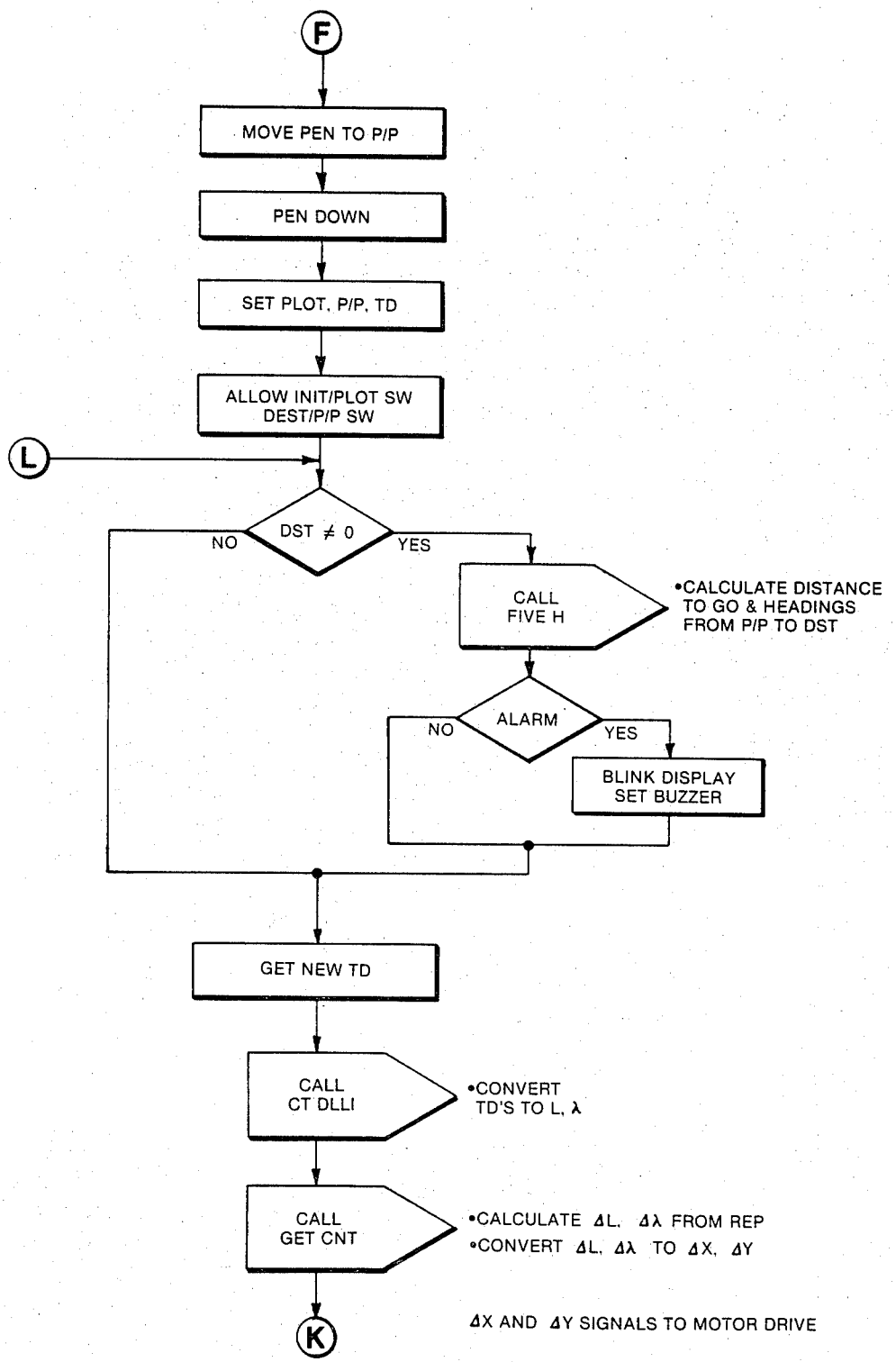

Referring to FIG. 4F, the pen is then moved to the present position and the pen is made to contact the paper during a pen-down step. The plotter then runs normally as indicated by the set plot, present position, and time difference block.

The next step is to set up a routine which would allow the operator to be able to switch back and forth between the initialization and plot or between destination and present position. At point L which is the basic plot, TDs are entered. During normal operation, the plotter keeps running track of distance to go, headings, etc. and also actuates an alarm.

When the process reaches point L, the first thing that the machine does is it checks to see if there is any destination stored in the plotter. If there is any destination, then it calls on a routine to calculate the distance to go and the headings from the present position to the destination. If the destination is not zero, then a CALL FIVE H step calculates distance to go and headings from present position to destination. If the present position is within a given distance from the destination, an alarm is initiated, the blank display is made to blink and a buzzer is actuated. In one case, if the vessel is within a half mile of the destination, the alarm is sounded. After this condition, the plotter receives the new TD and goes through a routine, CT DLL, to convert that current TD into latitude and longitude positions. It then calculates the $\Delta L$ and $\Delta \lambda$ from the reference points and converts $\Delta L$ and $\Delta \lambda$ to $\Delta X$ and $\Delta Y$ in the CALL GET CNT routine. These are the motor drive signals, and are available at K.

Figure 4G:
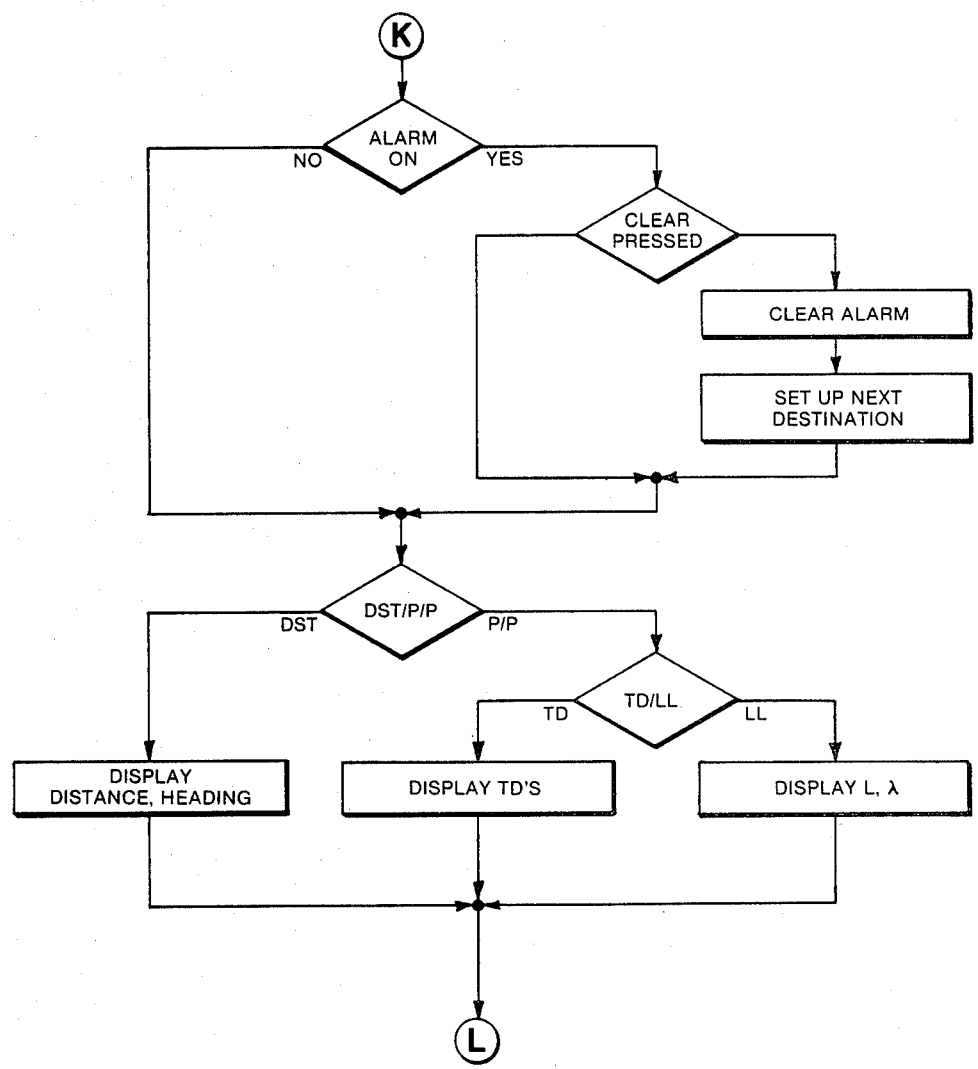

Referring to FIG. 4G, assuming that the vessel is within one half mile of the destination, the ALARM ON condition may be cleared by depressing the clear button to clear the alarm and set up the next destination. The machine then checks to see what the operator would like to display, either the destination or present position. If the present position switch is on, the unit further checks to see whether the present position should be displayed in TDs or latitude and longitude. The machine then loops back to L and does an iterative process with the usual output of this routine at K being the $\Delta X$ and $\Delta Y$ signals.

HYPERBOLIC LINE DRAWING

Referring now to FIGS. 5A through 5I, a method of rapidly drawing approximations to true hyperbolic lines includes the concept of the drawing of straight line segments to approximate the true hyperbolic curve.

Figure 5A:
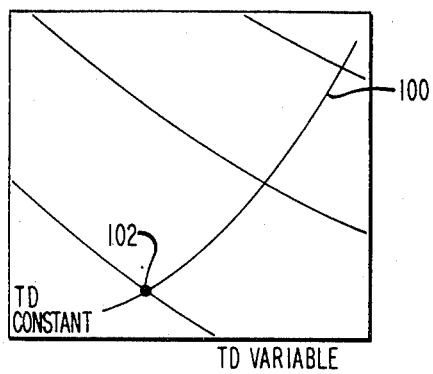
FIGS. 5A through 5I illustrate a procedure for approximating a hyperbolic line through the defining of START and GOAL points and by drawing lines from the START to GOAL points utilizing a midpoint therebetween.

Referring now to FIG. 5A, assuming a true hyperbolic line 100, which is to be approximated, and assuming a START point 102 on this hyperbolic line, which has the coordinates $TD_{constant}$, $TD_{variable}$, and assuming that the $TD_{constant}$ coordinates lie along hyperbolic line 100, whereas TD variable coordinates lie along hyperbolic lines which intersect line 100, then one embodiment of the subject approximation routine is as follows.

Figure 5B:
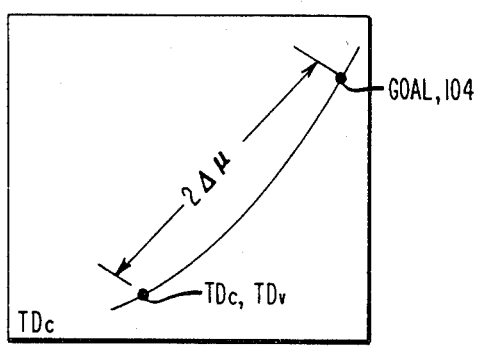
Figure 5C:
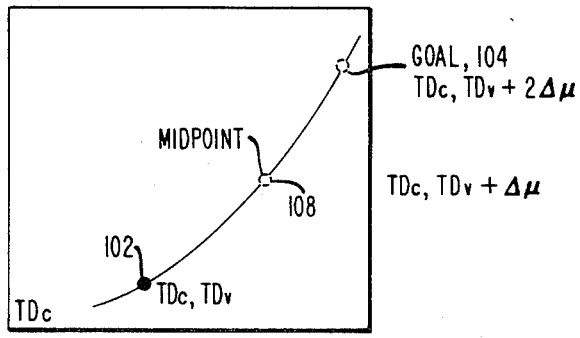

Referring to FIG. 5B, a GOAL 104 is defined along the $TD_{constant}$ line, a distance $2\Delta\mu$ from the point $TD_c$, $TD_v$. Thus the coordinates of the GOAL as illustrated in FIG. 5C is $TD_c$, $TD_v+2\Delta\mu$.

After having defined the GOAL, a midpoint along line $TD_c$ is calculated. This midpoint has the coordinates $TD_c$, $TD_v+\Delta\mu$. Note, the midpoint $\Delta\mu$ could be calculated first, followed by calculating the GOAL, $2\Delta\mu$.

Figure 5D:
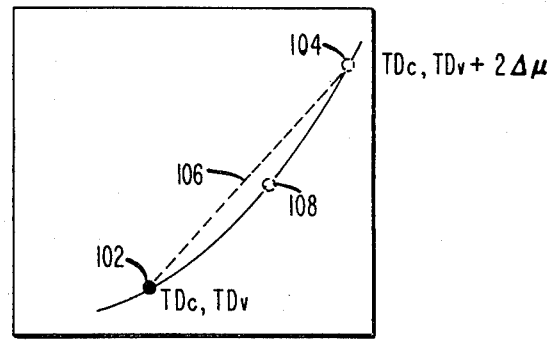

As illustrated in FIG. 5D, a straight line 106 between points 102 and 104 is calculated.

Figure 5E:
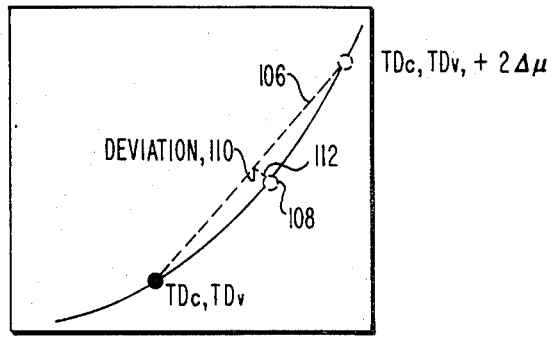

Referring now to FIG. 5E, the deviation 110 between midpoint 108 and the closest point to line 106 is calculated. In general this will be a line 112 which is perpendicular to line 106 and passes through midpoint 108. Of course, any method of deviation measurement can be substituted. The midpoint is however easily defined.

Figure 5F:
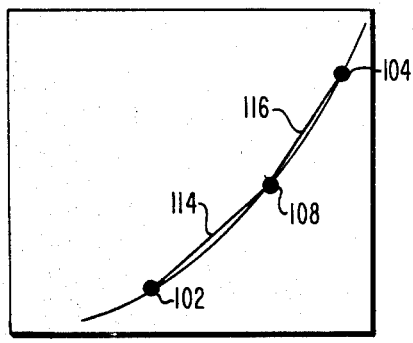

Having derived deviation 110, this is compared to a standard and if the deviation is less than the standard, straight lines 114 and 116 are drawn between points 102 and 108 and 108 and 104 respectively as illustrated in FIG. 5F.

Figure 5G:
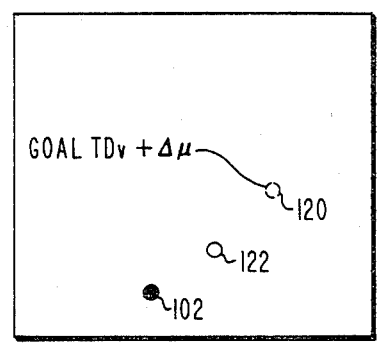
Figure 5H:
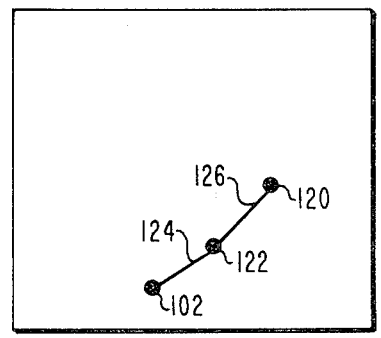

Should the deviation 110 of FIG. 5E be greater than that allowable, then a new GOAL 120 is defined as illustrated in FIG. 5G. In one embodiment, the GOAL is moved closer to point 102 by an amount equal to half the distance. Thus GOAL 120 is defined as $TD_v+\Delta\mu$, which it should be noted is the previous midpoint. The use of this previous midpoint also enhances the speed at which lines can ultimately be drawn. Note, a new midpoint 122 is defined as $TD_v+\frac{1}{2}\Delta\mu$. Should the deviation between a line drawn between 102 and 120 be less than the aforementioned limit, as illustrated in FIG. 5H, lines 124 and 126 are drawn between point 102 and point 122, and between point 122 and point 120.

Figure 5I:
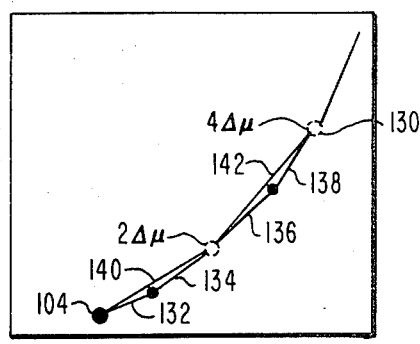

Referring to FIG. 5I, after the first successful drawing of straight line approximations of the hyperbolic line from a START to a GOAL, the original GOAL, assuming it was $2\Delta\mu$ removed from the START point, is increased such that the distance, in one embodiment, is made $4\Delta\mu$ from the new START point which was the GOAL of the original START point. Thus, for instance, a former GOAL 104 would be the new START point and the new GOAL would be set at point 130 $4\Delta\mu$ therefrom. Ordinarily, if the above routine were utilized without increasing the distance of the GOAL from its corresponding START, then the hyperbolic line would be approximated by lines 132, 134, 136 and 138.

However, by re-defining the GOAL distance to be twice that of the original START-GOAL distance, then the line approximation may be done with two pen strokes as illustrated by lines 140 and 142 as opposed to four short stubby pen strokes. What will be appreciated is that for shallow hyperbolic lines, these lines may be rapidly drawn with the minimum of pen strokes, and also with a minimum of computation time.

This technique of line approximation permits the drawing of the hyperbolic grid in as short a time as two minutes as opposed to a corresponding system which may take as long as an hour and a half to draw the corresponding hyperbolic line structure.

Of course the comparison between the present system and prior systems is dependent upon the degree of curvature of the hyperbolic line segment to be drawn. Thus for highly curved hyperbolic lines, the deviation during the process will often be exceeded and the GOAL distance will be reduced accordingly. Thus the savings in time will not be as drammatic.

DANGER ZONE INDICATION

Figure 6:
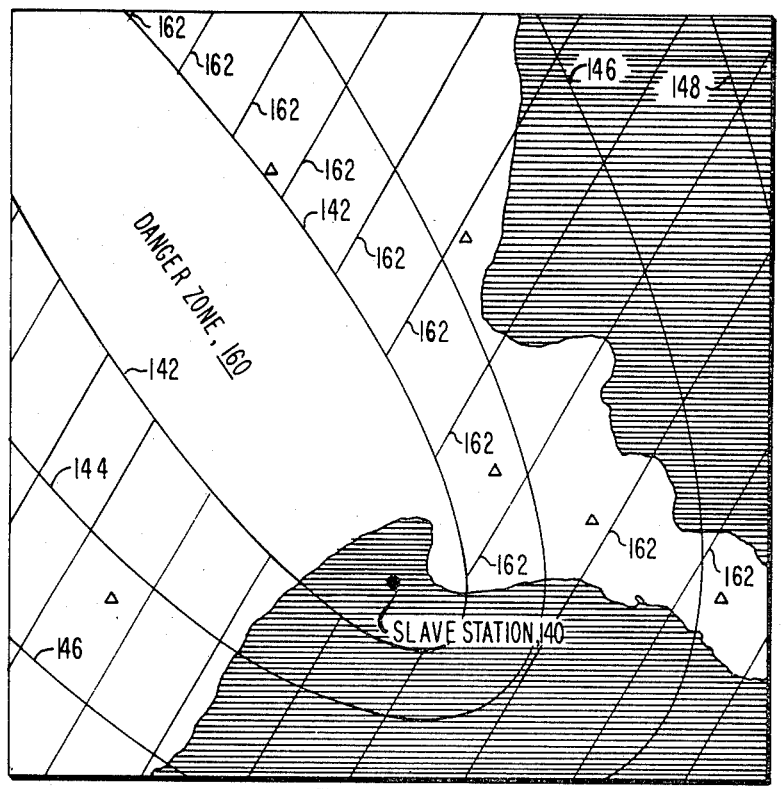
FIG. 6 is a diagrammatic illustration of an extended base line danger zone which exists about a base line extended from a slave station.
Figure 7:
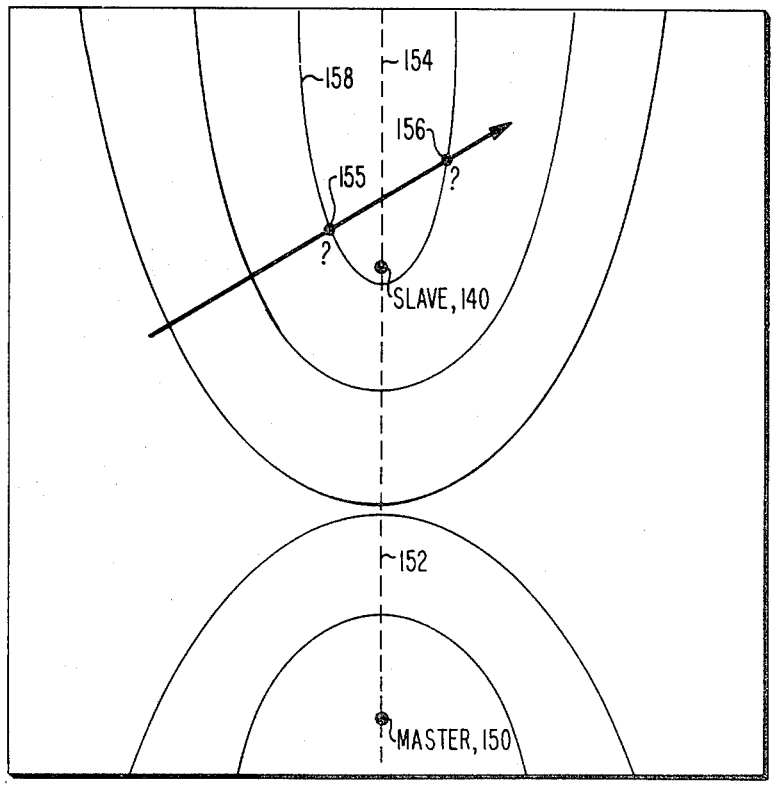
FIG. 7 is a diagrammatic illustration of positional ambiguity when traversing the danger zone.

Referring now to FIG. 6, a typical hyperbolic navigation situation is illustrated in which a slave station 140 has associated with it a number of hyperbolic time difference lines 142, 144, 146 and 148. These time difference lines, as illustrated in FIG. 7, are those associated with time differences between slave 140 and a master station 150. A base line 152 extends from master station 150 through slave station 140 and emerges as a base line extension portion 154 on the side of the slave station away from the master.

When a vessel is crossing a zone surrounding the base line extension, his position may be in doubt insofar as he may be at a position 155 or a position 156 and the hyperbolic navigation unit will read out the same number, the time difference number corresponding to the time difference line 158. Ordinarily this is not a problem for locations removed from the base line extension. However, in the vicinity of a slave station the ends of hyperbolic time difference lines are not very spaced apart, such that the difference between point 155 and 156 may be as little as two miles. This presents a navigational problem insofar as the pilot of a vessel may believe that he is at one place according to the hyperbolic navigation system when he is in fact at another place.

When it is not possible within the hyperbolic navigation system to resolve this ambiguity, the pilot can resolve this ambiguity by plotting his position outside of a danger zone and then by plotting his dead reckoning track so as to know at which of the two possible points he is located.

Referring back to FIG. 6, a danger zone 160 is illustrated in which hyperbolic navigation lines are prevented from being drawn. The absence of hyperbolic navigation lines gives the pilot a visual indication that he must plot his dead reckoning track in order to ascertain his exact position or fix. In the subject invention, the danger zone is defined by choosing one hyperbolic time difference line such as line 142 and then preventing the drawing of transverse hyperbolic navigation lines 162 within the danger zone.

It is a matter of judgment, taking into account the scale of a chart as well as the microsecond spacing between the hyperbolic lines, as to which of the hyperbolic lines closely surrounding a slave station will be chosen to define the danger zone. In one embodiment, a 10 microsecond hyperbolic line is chosen which for a given region, establishes the transverse danger zone. With such as warning, it is possible that a pilot will have sufficient warning of a danger zone to have him calculate the dead reckoning track. It is of course within the scope of this invention to choose any particular time difference line which has as it focus the slave station and which extends away from the master station to define the paticular danger zone.

Figure 8:
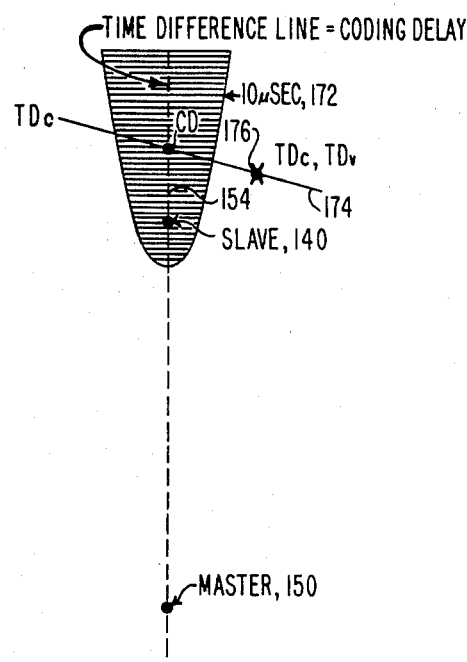
FIG. 8 is a diagrammatic illustration illustrating the definition of coding delay and the hyperbolic line utilized in defining the danger zone as well as a transverse hyperbolic line which transits the danger zone.

Referring to FIG. 8, it will be appreciated that the base line extension 154 from master 150 through slave 140 represents the coding delay.

Figure 9:
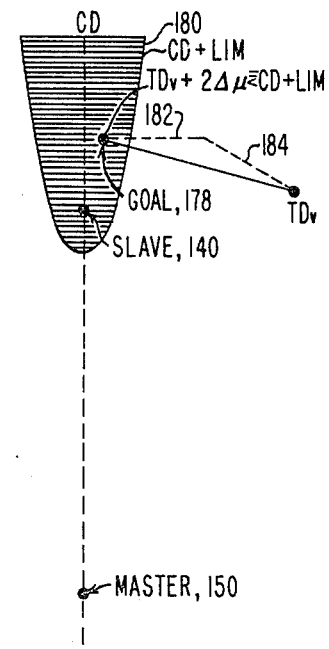
FIG. 9 is a diagrammatic illustration of the situation in which a proposed GOAL is within the danger zone.
Figure 10:
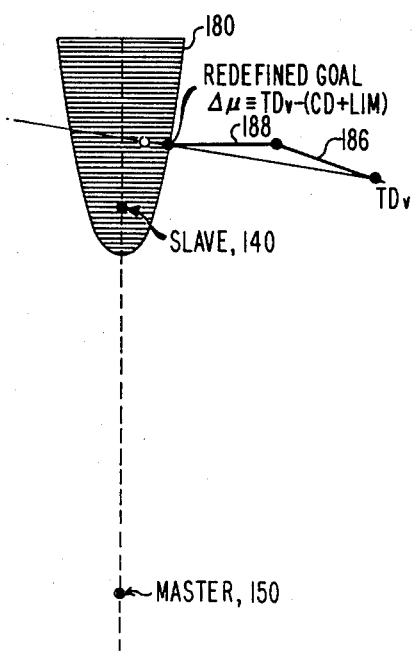
FIG. 10 is a diagrammatic illustration of a redefined GOAL which prevents the drawing of a transverse hyperbolic line into the danger zone.

Assuming that it is desired that the danger zone be defined by the 10 microsecond time difference line 172 and further assuming that it is desired to draw a further time difference line 174 through the danger zone in which this line represents time difference line $TD_c$, and assuming further that a point on line $TD_c$ is a point having coordinates $TD_C$, $TD_v$, this point being indicated by reference character 176, then, as illustrated in FIG. 9, it is possible that a GOAL 178 for drawing this line may exist in the danger zone such that if, for generic purposes we define line 180 to be the coding delay plus some limit, for instance, 10 microseconds, then it will be appreciated that GOAL 178, may have a coordinant $TD_v+2\Delta\mu \leq CD+LIM$, where LIM is some limit established by the hyperbolic line chosen to represent the danger zone. In exaggerated form, if the printing process were allowed to commence as usual, the line would be approximated by lines 182 and 184 being drawn on the chart surface.

In order to prevent such an occurrence, the GOAL for the $TD_c$ line is redefined such that $\Delta\mu$ is equal to $TD_v-(CD+LIM)$. Thereafter the approximation line is drawn by drawing lines 186 and 188 with line 188 ending exactly on line 180. This prevents the drawing of this line into the danger zone.

In summary, what has transpired to prevent the drawing of lines in the danger zone is to redefine the GOALS of transverse hyperbolic lines such that the GOAL lies on the predetermined time difference line defining the danger zone. This is accomplished simply by recognizing the coordinates of the GOAL as existing at a point or position within the danger area and then redefining the GOAL to be a coordinant in which the START point $TD_v$ has subtracted from it the quantity CD or the coding delay plus the time difference corresponding to the predetermined limit. This places the GOAL on the time difference line defining the danger zone and the drawing process proceeds as described in FIGS. 5A through 5I.

It will be appreciated that any computer may be easily programmed to do the computations described, with the drawing portion being accomplished as described hereinafter. Note, grid unit 80 is provided with a computer to do the calculations, with its output being numbers which represent desired pen position in terms of $\Delta X$ and $\Delta Y$ from 0,0.

DUAL CLOCKING RATE

Figure 11:
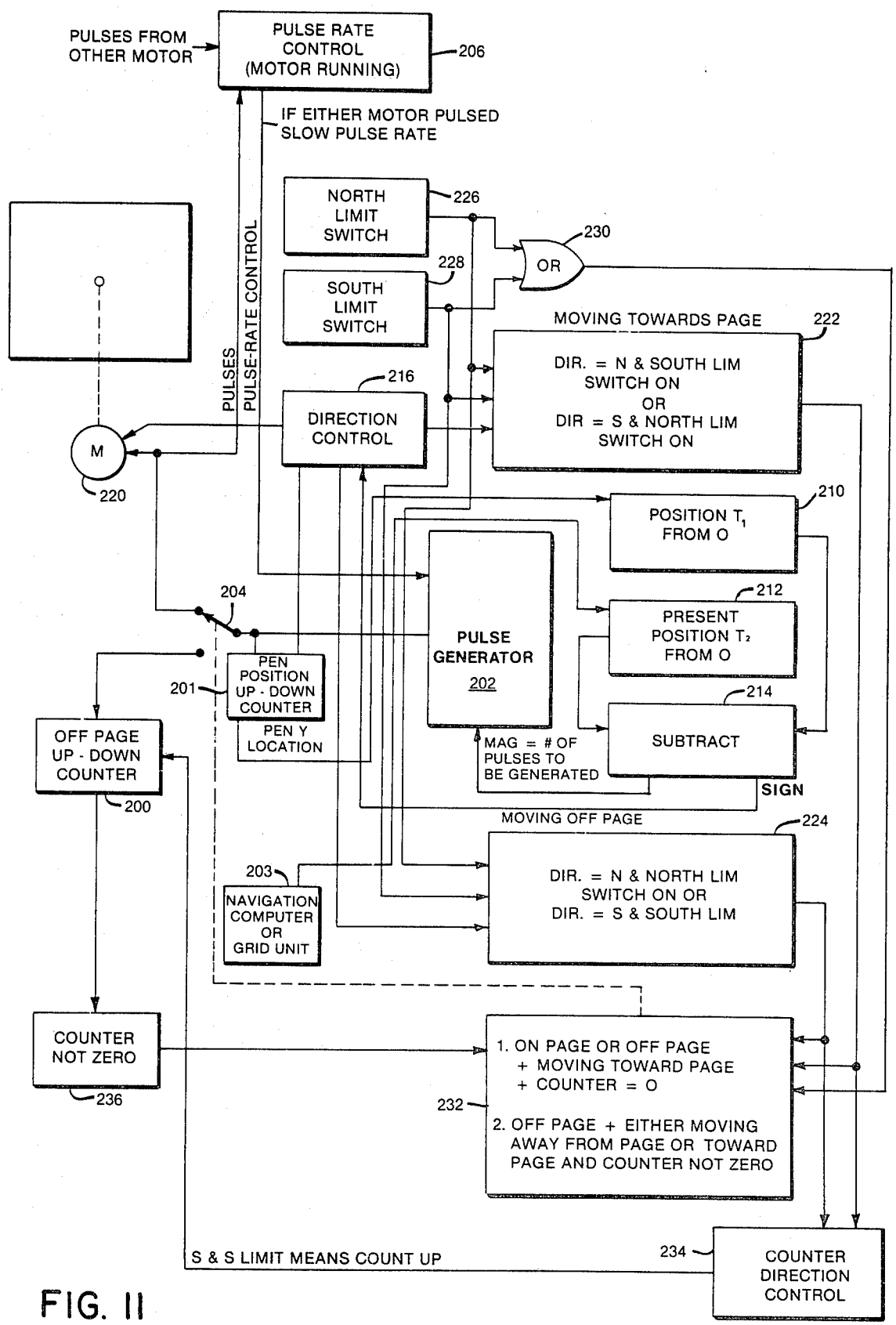
FIG. 11 is a block diagram illustrating the functions performed by the motor drive driven by the plotter drive of FIG. 2.

Referring now to FIG. 11, a system for controlling and storing vertical pen movements is illustrated, with a like system being assumed for horizontal pen movement. In this system, an up-down counter 200 is provided to keep track of the position of a vessel or destination, with the count in the counter representing a $\Delta Y$ from the edge of the plotting surface. Thus, this counter keeps track of whether or not the vessel position is on-chart or off-chart. An up-down counter 201 is provided to keep track of Y pen location whether on or off chart, and it is this counter, along with counter 200, which is clocked at high rates when the pen is off-page so that computations can be readily made. Counter 201 is initialized at 0,0 and then keeps track of Y positions in terms of pulses from a pulse generator 202.

Counter 200 is also driven by pulse generator 202, connected through a double throw single pole switch 204. The rate at which pulse generator 202 produces pulses, is controlled by a pulse rate control 206, which when either motor is running, provides that the pulse generator generate pulses at a slow pulse rate. For each cycle of the plotter, pulse generator 202 produces a number of output pulses corresponding to the difference in Y position (from the reference point Y=0) of vessel at a time $T_1$ and time $T_2$. The position of the vessel at $T_1$ is available from the unit diagramatically illustrated at 210 driven by the output of counter 201 which represents the last Y position of the pen, referenced to 0,0. The position at $T_2$, to which the pen is to be driven, is available from the unit diagramatically illustrated at 212. The position to which the pen is to be driven comes from navigational computer or grid unit 203. The output of navigational computer or grid unit 203 is the number of Y pulses to drive the pen from 0 to the Y position of the vessel at $T_2$. These two numbers (from units 210 and 212) are subtracted one from the other at a unit 214, with the magnitude of the result being applied to pulse generator 202 and with the sign of the movement being applied to a direction control unit 216. For example, if position at $T_2$ is 12 pulses north of position at $T_1$, the pulse generator 202 will give out 12 pulses while the direction control unit 216 will indicate North. The output of direction control unit 216 controls the direction of motor 220 and is also applied to units 222 and 224, which are concerned with the situation in which the pen is moving towards the page from a position off the page; and a situation involving the moving of a pen off the page. Units 222 and 224 are provided with the outputs of a north limit switch 226 and a south limit switch 228, such that the subject system operates to control the vertical movement of the pen via motor 220, with the horizontal movement of the pen being likewise controlled with a similar system.

The outputs of the north and south limit switches are applied to an OR gate 230, the output of which is applied to a unit 232, which controls the position of switch 204 to couple pulses from pulse generator 202, either to motor 220 or to updown counter 200.

As will be described, pulses which cannot be put into the motor due to the pen arriving at the edge of the charting surface are provided to the up-down counter. Thus the number of pulses or counts in the counter are the number of pulses to go from a present off-chart position to the edge of the charting surface.

Units 222 and 224 are also utilized as inputs to unit 232 as will be described. The outputs of units 222 and 224 are also supplied to a counter direction control unit 234, the output of which controls the direction of the counter 200. Thus, whenever the pen is at the edge of the charting surface and moving away from the surface, counter 200 counts UP and when the pen is at the edge of the surface moving towards the surface, counter 200 counts DOWN.

In operation, switch 204 is in position #1 as illustrated, Position #1 refers to the condition that the pen is on the page, or that the pen is off the page and moving toward the page with counter 200 having a zero count. This would mean that a negative output of counter not zero unit 236 would indicate that the count of up-down counter 200 is zero.

With each plotter cycle, the pen is moved in the vertical direction as dictated by the output from the processed LORAN C signals. It may be that during the plotting cycle, the pen is to represent a position off the plotting surface. In such a case, either the north or south switch would be actuated. In the case that the pen is moving off the page, this will be indicated by a northerly direction and the north limit switch ON or a southerly direction and the south limit switch ON. Upon such an occurrence, the counter direction control unit indicates a change in direction in that if the pen is moving in a southerly direction and the south limit switch is ON, this means that a counter 200 is to count up.

Upon hitting the south limit switch, switch 204 is switched from position #1 to position #2, which is the position indicated by an off-page pen move and either the pen moving away from the page, or towards the page and a counter not zero condition.

Upon the positioning of switch 204 to position #2, pulses are removed from pulse rate control 206, which generates a signal which is coupled to pulse generator 202 to increase the pulse rate dramatically, thus to deliver the indicated number of pulses to both of the up-down counters at a fast clock rate.

Should the pen be moving towards the page, this would be indicated at unit 222 either by the pen going in a northern direction with the south limit switch ON, or the pen going in a southerly direction with the north limit switch ON. Such a condition is indicated at counter direction control 234, which controls up-down counter 200 accordingly.

Such a signal is also delivered to unit 232 which, since the pen is off-page, and moving towards the page, with a counter not zero condition, positions switch 204 to position #2, thereby to clock both up-down counters at a fast rate by virtue of removing pulses from pulse rate control 206. When the pen reaches the page, this is sensed at unit 232 and switch 204 is returned to position #1. This results in the production of clock pulse, which is not only supplied to the motor, but also is applied to pulse rate control 206 to control pulse generator 202 to reduce the rate at which pulses are generated commensurate with pen movement speed.

From the foregoing, it can be seen that whenever the pen is off the charting surface or page, the counters both of which keep track of the vessel position, are clocked at a maximum rate so as not to slow down any computational process which utilizes the outputs of the counters.

Figure 12:
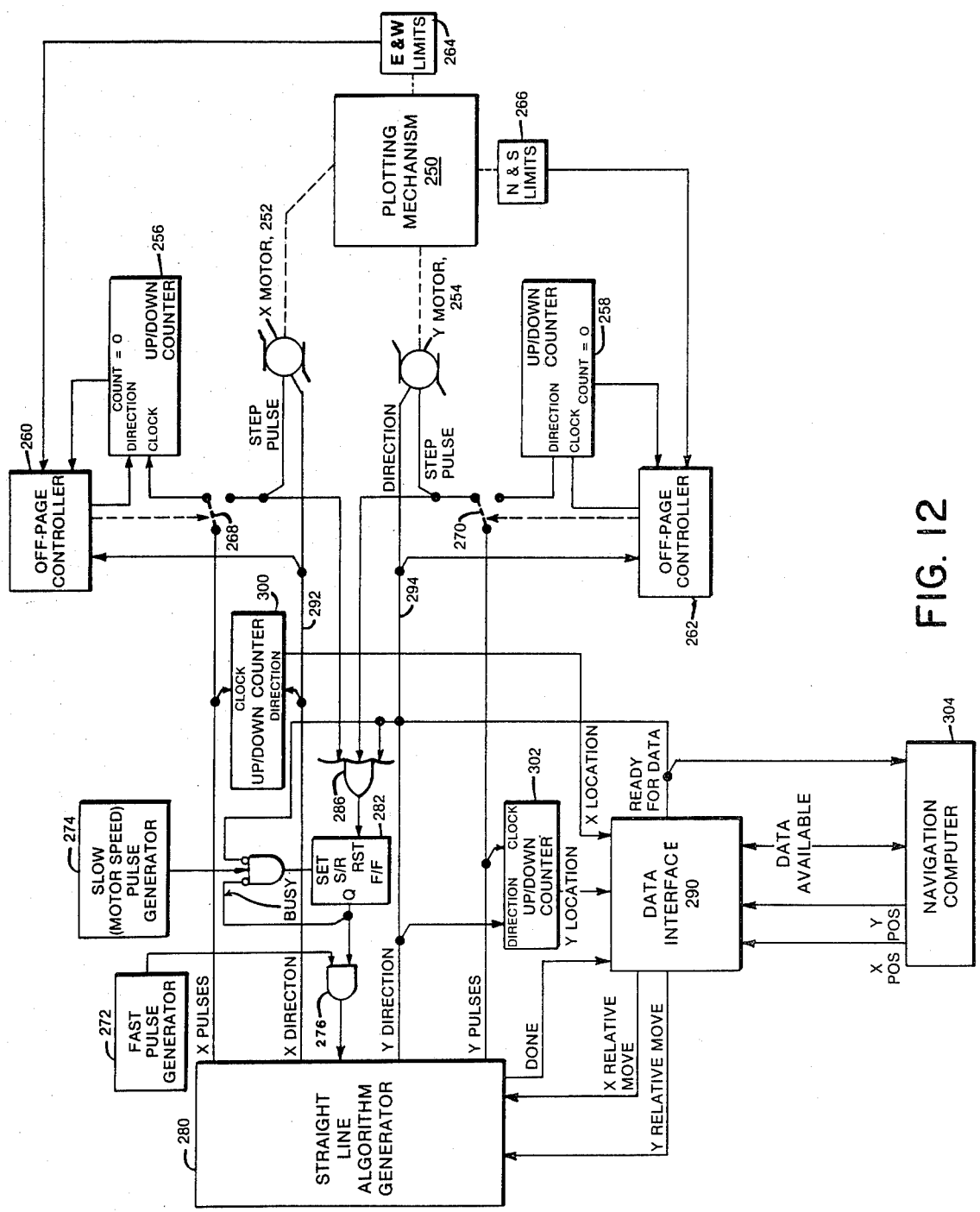
FIG. 12 is a block diagram illustrating motor drive circuitry for the plotter of FIG. 2.

A plotting system which utilizes this type control, is illustrated in FIG. 12, in which a plotting mechanism 250 is driven by an X step pulse motor 252 and a Y step pulse motor 254. An up-down counter 256 is provided for the X motor, whereas an up-down counter 258 is provided for the Y motor. These counters keep track of off page distance and correspond to counter 200 of FIG. 11. These counters have count zero outputs which are applied respectively to off-page controllers 260 and 262. These outputs perform the function of the counter not zero unit 236 in FIG. 11. Also coupled to respective off-page controllers are east, west limit switches diagramatically illustrated at 264 and north, south limit switches diagramatically illustrated at 266. Clock pulses are delivered to the up-down counters or to the motors depending on the position switches 268 and 270, the position of the switches being controlled by the off-page controller. Each off-page controller determines the motion of the pen to be on or off page in a manner exactly like blocks 222, 224 and 232 of FIG. 11.

The plotter is provided with a fast pulse generator 272 and a slow pulse generator 274 with the fast pulse generator pulses coupled through an AND gate 276 to a straight line algorithm generator 280. The other input to AND gate 276 is from the Q output of a flip-flop 282, the output of which is supplied to an AND gate 284 having two inverting input terminals and one non-inverting input terminal. This non-inverting input terminal is coupled to slow pulse generator 274's output terminal. The output of AND gate 284 is coupled to the set terminal of flip-flop 282, with the Q output terminal of flip-flop 282 being coupled to one of the inverting terminals to AND gate 284 as a "busy signal". The reset terminal of flip-flop 282 is coupled to the output of an OR gate 286. The other inputs to OR gate 286 are from the step pulse input to the X and Y motors and also a "ready for data" signal from a data interface 290. These blocks (272, 274, 276, 282, 284 and 286) comprise pulse generator 202 and Pulse Rate Control 206 of FIG. 11. During a straight line move of the pen, slow pulses from the slow pulse generator 274 cause the Q output of F/F 282 to go high allowing fast pulses to be coupled to the straight line algorithm generator 280. These pulses cause the straight line algorithm generator to output X pulses and Y pulses until at least one of the motors is stepped or the position to which the pen was moving is reached. This is accomplished via OR gate 286, which senses any of these conditions and clears the Q of F/F 282 to a low state. This in turn stops pulses from reaching the straight line algorithm generator via AND gate 276. In addition, pulses are inhibited between moves because the "ready for data" signal is then high stopping pulses from setting F/F 282 via AND gate 284 and simultaneously holding Q of F/F 282 clear (low) through OR gate 286.

It should be noted that a pulse from AND gate 276 always results in a pulse on at least one of the two X pulse or Y pulse lines.

In order to obtain slow motor pulses the first fast pulse from AND gate 276 causes a pulse to be transmitted to one of the motors. When this occurs the Q output of F/F 282 is reset and is not set again until the next pulse from the slow pulse generator. Thus the output of AND gate 276 is a stream of pulses at the slow clock pulse rate.

Slow motor pulses will only be generated when either switch 268 or 270 is switched by its corresponding controller to place pulses on both a motor and OR gate 286.

Straight line algorithm generator 280 couples X pulses and Y pulses respectively to switches 268 and 270 and X and Y direction signals over lines 292 and 294 to the X and Y motors and to their corresponding off-page controllers.

Controlled by the X pulses and the X direction signals, is an up-down counter 300, the output of which, the X location, is coupled to data interface 290. Similarly, an up-down counter 302 is controlled by the Y direction and Y pulse lines so as to yield the Y location which is made available to the data interface. X and Y locations correspond to the current position of the pen with respect to the reference location. These functions are the same as Present Position at $T_1$, from 0 units, eg unit 210 in FIG. 11 for the Y direction. X position and Y position signals from navigation computer 304 are applied to the data interface. The data interface subtracts these positions from X location and Y location to form an X relative move and a Y relative move to the straight line algorithm generator. When the straight line algorithm generator has generated the appropriate pulses for the particular move, a "done" signal is applied to data interface 290 which results in a "ready for data" signal applied to OR gate 286, for the appropriate resetting of flip-flop 282. A "ready for data" signal is also applied to navigational computer 304 to acknowledge ability to receive the next move.

With an X position and a Y position noted, it is possible to calculate the relative X and Y move to provide the appropriate number of pulses either to the stepping motors or to the up-down counters associated with the stepping motors. There is however a more efficient or less efficient method of drawing lines from one position to another. This can be seen by the diagram of FIG. 13.

Figure 13:
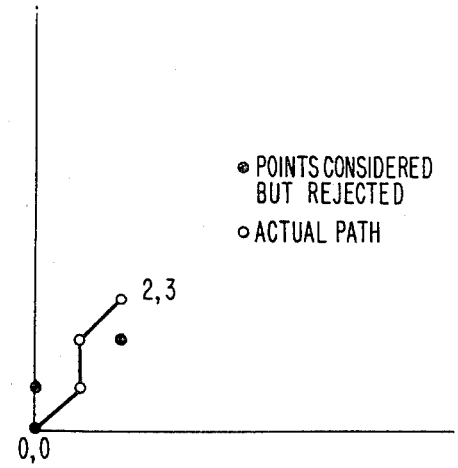
FIG. 13 illustrates the results of utilizing a specialized plotting algorithm in the control of the pen in order for the pen to go from one point to another.

Referring now to FIG. 13, assuming that it is desirable to go from 0,0 to 2,3, one may move the pen through a variety of moves. For instance, one could move the pen two units to the right and three units upwardly to reach point 2,3.

However, it is found that it is perhaps more efficient to generate such a line by moving diagonally and vertically in a succession of steps. The preferred path is illustrated as in involving applying one step pulse to each motor simultaneously, followed by providing one pulse to the vertical driving motor followed by applying one pulse simultaneously to the vertical and horizontal driving motors, thereby in this sequence reaching the point 2,3 in the most practical manner.

To understand the criteria by which efficient moves are made, consider that each move made by a motor is treated as a relative move NX, NY from a previous position X,Y, NX is the distance to be moved in the X direction and NY is the distance to be moved in the Y direction by subtracting the present position from the new move arguments (NXR, NYR) new X and Y positions that the pen is to move to relative to the reference position, from the present position stored in XCTR, YCTR, counters 300 and 302 of FIG. 12. Thus, the line to be followed, can be thought of as starting at the origin (0,0). Its straight line equation is $(x/NX)=(y/NY)$ or similarly $x \cdot NY - y \cdot NX = 0$. Since x and y must be integers, we can at best stay within $\frac{1}{2}$ pulse spacing of the true line. A relative gauge of error for any point, $x_1$, $y_1$, is the value of CUME in the equation $x_1 NY - y_1 NX = CUME$. The algorithm used chooses the direction in which the lines are to be drawn by picking points such that the absolute value of the CUME term is a minimum.

As an example, since x and y start at zero for a relative move, and since each variable is changed by one step at a time, the value of $x_1 NY - y_1 NX = CUME$ can be kept as a running total without utilizing a multiply instruction. Also since the motor utilizes separate direction and pulse lines, it becomes easy to set the motor direction lines and then use $|NX|$ and $|NY|$ to calculate the straight line. The algorithm does a look ahead at the relative error (CUME) of the next possible moves. These moves include step X once, step Y once and step both X and Y once. The error after each of these moves is a simple function where CUME is the relative error function $x_1 NY - y_1 NX = CUME$ of the current point. These errors are as follows:

For step Y once: new CUME=CUME−NX. For step X once: new CUME=CUME+NY. For step both X and Y once: new CUME=CUME+NY−NX.

It is a finding of this invention that, once knowing the greater of NX, and NY, it is only necessary to examine two of the three possible moves. For example, if NY is greater than NX, then the move step X once is disregarded, since this will never yield the minimum error. Thus, at the beginning of each move, when NY and NX are calculated from NXR and NYR, a flag is set indicating which is greater (NY or NX). Then in subsequent calls to the motor, this flag is checked to determine which of the two moves to consider. In the example of FIG. 13, the move 0,0 to 2,3 is done with the following computations:

Step one requires that CUME=0. For step Y the new CUME=−2 and for stepping both X and Y the new CUME=3−2 or +1. Therefore, stepping both motors simultaneously is indicated since $|-1|$ is less than $|2|$.

For step two CUME=1, such that for step Y, the new CUME is 1−2=−1, whereas for stepping both X and Y the new CUME is 1+3−2=2. In this case the step Y move is indicated since its absolute value is 1.

Step three finds that the CUME is equal to −1. For step Y, the new CUME is equal to −1−2 or −3. For stepping both, X and Y the new CUME is −1+3−2 or 0. Thus for step three, the stepping motors are both stepped simultaneously as this is the most advantageous way of going from the step two position to the step three position.

As can be seen from FIG. 13, various points were considered and rejected with the path being drawn as illustrated.

Figure 14A:
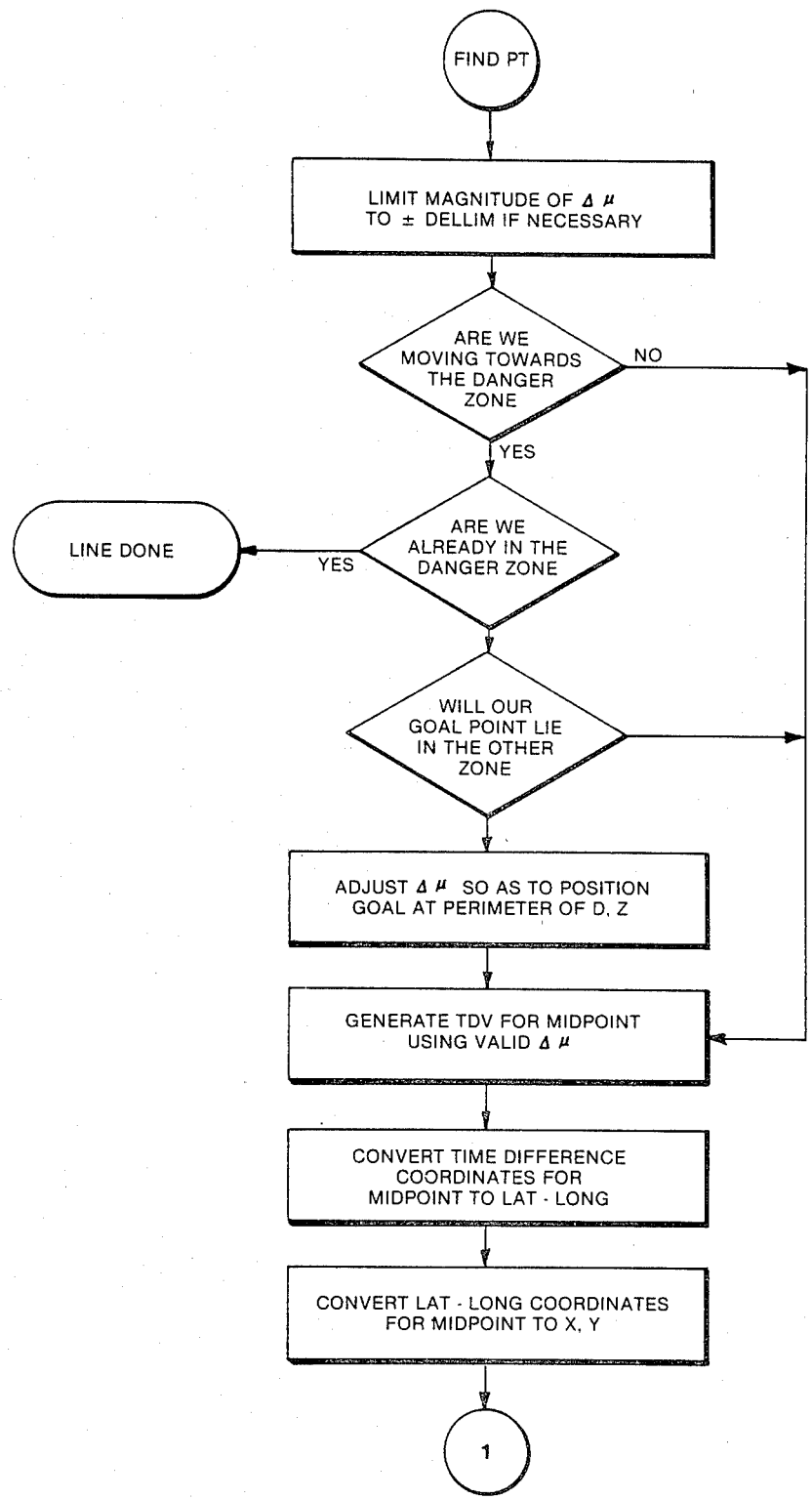
FIGS. 14A through 14C illustrate a flow diagram for the hyperbolic line drawing and danger zone indicating embodiments of FIGS. 5-10.
Figure 14B:
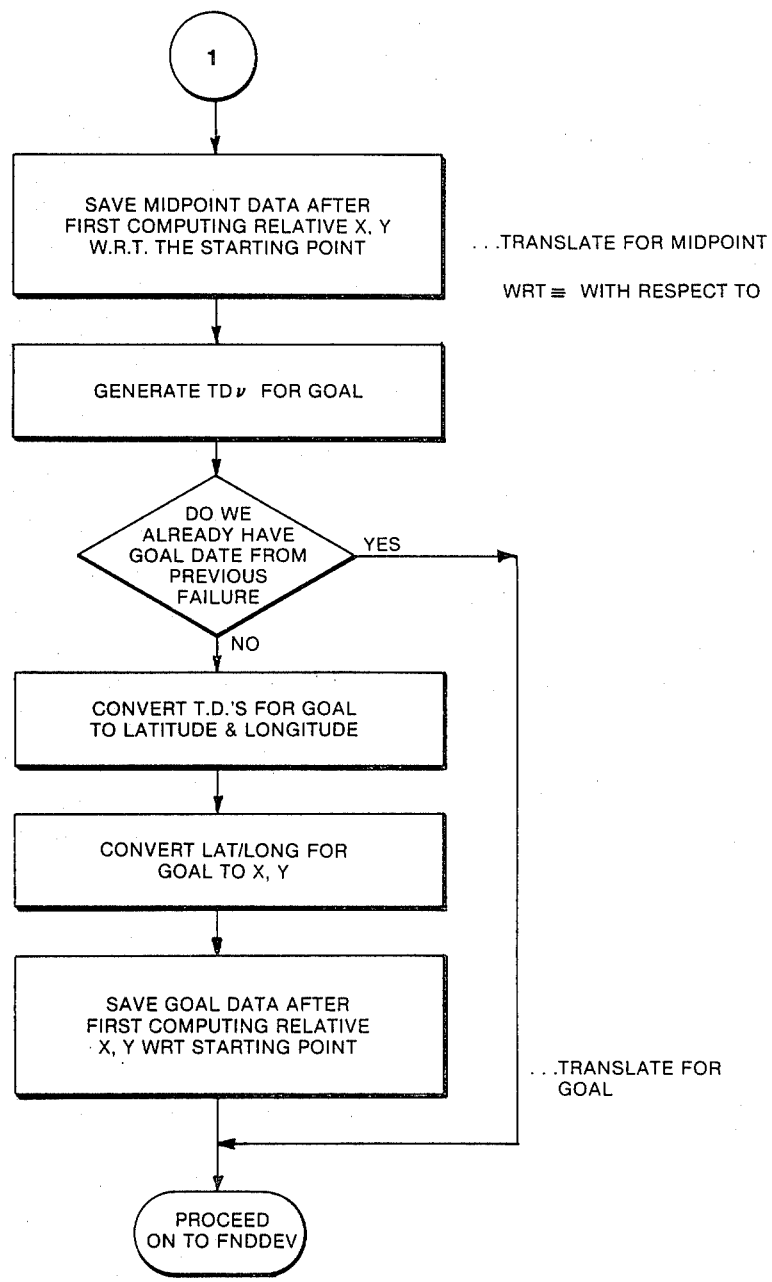
Figure 14C:
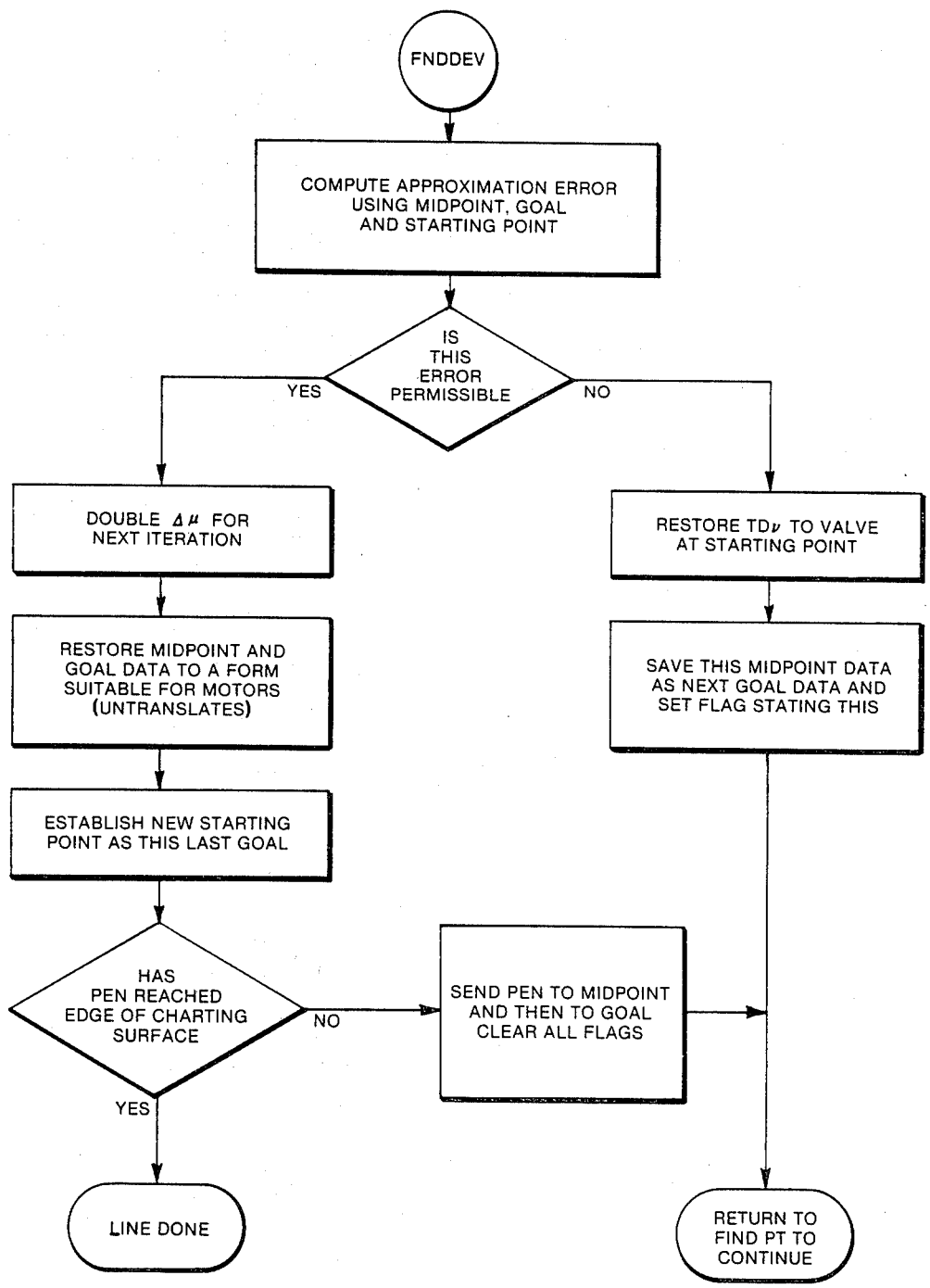

Referring to FIGS. 14A-14C, this flow chart is self-explanatory for the operations involving drawing grid lines and avoiding danger zones as described in FIGS. 5-10.

GENERAL CONSIDERATIONS FOR HYPERBOLIC NAVIGATION SYSTEMS

In any hyperbolic navigation system which is based on the use of hyperbolic lines, a pair of readings will, in general, indicate two locations on the earth's surface. For most navigational situations, the fact that this pair of readings indicates two positions is not a problem because the positions involved are usually spaced apart by as much as hundreds of miles. Where this characteristic of a hyperbolic navigation system becomes troublesome is where these two points are sufficiently close together that the navigator, upon obtaining a pair of readings, may assume that he is at one point when he is in fact at the other point. Because hyperbolic lines tend to be narrowest around a base line extension, either extending away from a slave station or away from a master station, it is important that a navigator be aware that the ambiguity may exist. Thus, regions of ambiguity exist behind both master and slave stations, and when the two ambiguous points are sufficiently close together, it is important to alert the navigator.

By virtue of prohibiting the drawing of lines in a predetermined danger zone, at the very least, the operator is alerted to the fact that he is in the vicinity of a base line extension. He may then choose any of a number of techniques for assuring proper resolution of the aforementioned ambiguities.

While the present system has been described in terms of its present use with hyperbolic navigation systems, it will be apparent that the subject plotter may be used with other navigation systems such as the Range-Range system, which allows a navigator to derive his position by determining the intersection of two circles of constant range.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A plotter for use on board a vehicle in which said plotter is provided with navigation signals received at said vehicle comprising:
   an X/Y plotter having a moveable pen and a charting surface;
   means for driving said pen in accordance with the difference in position between the position represented by said navigation signals and the position of an initialization point on the charting surface; and,
   means for establishing said initialization point at a position on the charting surface remote from that representing the position of said vehicle, said establishing means including said pen placed at the position on said charting surface representing said remote initialization point position and means for automatically providing said driving means with the navigation signal coordinates of said pen when at said remote initialization point position.

2. A plotting system for use on board a vehicle in which said plotter is provided with navigation signals from a receiver at said vehicle comprising:
  means for generating pen positioning signals in accordance with navigation signals from said receiver, said pen positioning signals being in the form of drive pulses;
  an X/Y plotter having a moveable pen, a charting surface and stepping motor means coupled to said drive pulses for positioning said pen;
  at least one counter coupled to said drive pulses for keeping track of the effective position of said pen by virtue of the count thereof; and,
  means for facilitating rapid off-chart calculations of pen position including means for increasing the rate of said drive pulses to said counter when the position dictated by said pen positioning signals indicates a pen move within the off-chart area.

3. The plotting system of claim 2 wherein said rate increasing means increases said drive pulse rate when the effective position of said pen is either in an off-chart position and said effective position is to be moved towards said chart, or when the effective position of said pen is either at a chart edge and is to be moved off-chart, or the effective position of said pen is off-chart and is to be moved further off-chart.

4. The plotting system of claim 2 wherein said pen positioning signals correspond in number to the difference in position between one position and another position.

5. The plotting system of claim 2 wherein said pen positioning signals are generated in response to the receipt of said navigation signals and corresponds in number to the difference in position between a present vehicle position and a prior vehicle position.

6. The plotting system of claim 2 wherein said pen positioning signals are generated in response to a predetermined set of navigation signals and an initial set of navigation signals.

7. The plotting system of claim 2 and further including means for interrupting the coupling of said drive pulses to said stepping motor means when the effective position of said pen is off-chart.

8. The plotting system of claim 7 wherein said interrupting means includes an off-chart counter and means for coupling said drive pulses to said off-chart counter when said pen reaches a predetermined edge of said charting surface such that when said pen reaches an edge of said charting surface, said pen stops and the drive pulses are diverted to said off-chart counter, a predetermined count of said off-chart counter controlling said coupling means to remove said drive pulses from said off-chart counter and to apply said drive pulses to said stepping motor means.

9. The plotting system of claim 8 wherein said off-chart counter is driven at said increased rate.

10. The plotting system of claim 8 wherein said off-chart counter is an up-down counter, said predetermined count is zero, and further including means for determining the direction of said pen relative to said edge and for controlling the direction of said counter depending on whether the movement of the effective position of said pen is towards or away from said predetermined edge.

11. The plotting system of claim 10 wherein said direction determining means includes switch means for sensing when said pen is at said predetermined edge.

12. A plotting system for use on board a vehicle in which said plotter is provided with navigation signals from a receiver at said vehicle comprising:
  means for generating pen positioning signals in accordance with navigation signals from said receiver, said pen positioning signals being in the form of drive pulses;
  an X/Y plotter having a moveable pen, a charting surface and stepping motor means coupled to said drive pulses for positioning said pen;
  at least one counter coupled to said drive pulses for keeping track of the effective position of said pen by virtue of the count thereof;
  means for increasing the rate of said drive pulses to said counter when the position dictated by said pen positioning signals indicate a pen move within the off-chart area; and,
  means for interrupting the coupling of said drive pulses to said stepping motor means when the effective position of said pen is off-chart, said interrupting means including an off-chart counter, means for coupling said drive pulses to said off-chart counter when said pen reaches a predetermined edge of said charting surface such that when said pen reaches an edge of said charting surface, said pen stops and the drive pulses are diverted to said off-chart counter, and means responsive to a predetermined count of said off-chart counter for controlling said coupling means to remove said drive pulses from said off-chart counter and to apply said drive pulses to said stepping motor means.

13. The plotting system of claim 12 wherein said off-chart counter is driven at said increased rate.

14. The plotting system of claim 12 wherein said off-chart counter is an up-down counter, said predetermined count is zero, and further including means for determining the direction of said pen relative to said edge and for controlling the direction of said counter depending on whether the movement of the effective position of said pen is towards or away from said predetermined edge.

15. The plotting system of claim 14 wherein said direction determining means includes switch means for sensing when said pen is at said predetermined edge.

16. A plotter for use on board a vehicle in which said plotter is provided with navigation signals received at said vehicle comprising:
  an X/Y plotter having a moveable pen and a charting surface having fixed objects thereon;
  means for driving said pen in accordance with the difference in position between the position represented by said navigation signals and the position of an initialization point on the charting surface; and,
  means for establishing said initialization point at a position on the charting surface remote from that representing the position of said vehicle, said establishing means including said pen placed at a fixed object on said charting surface representing said remote initialization point position and means for automatically providing said driving means with the navigation signal coordinates of said pen when at said remote initialization point position.

* * * * *